REGISTRY OF RETINAL IMAGE AND DISPLAY SCREEN WITH FIXATION POINT AT CENTER OF SCREEN

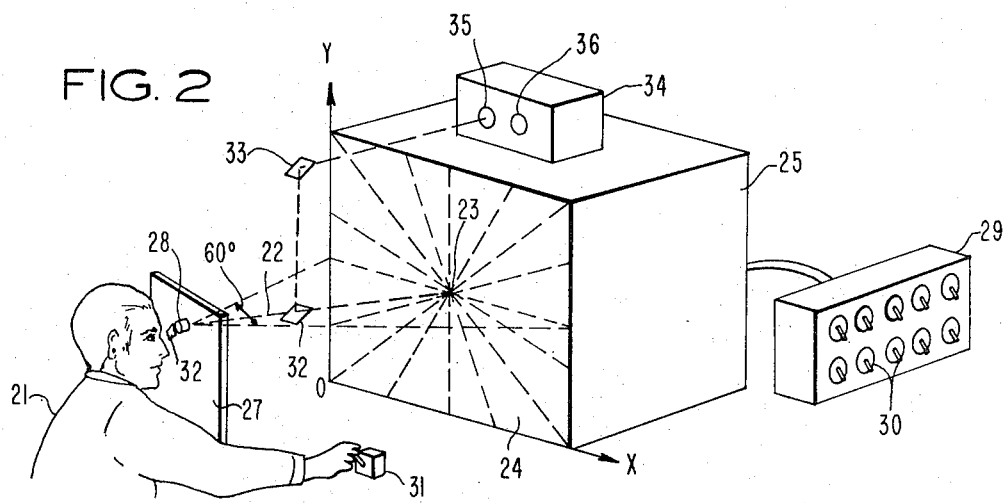
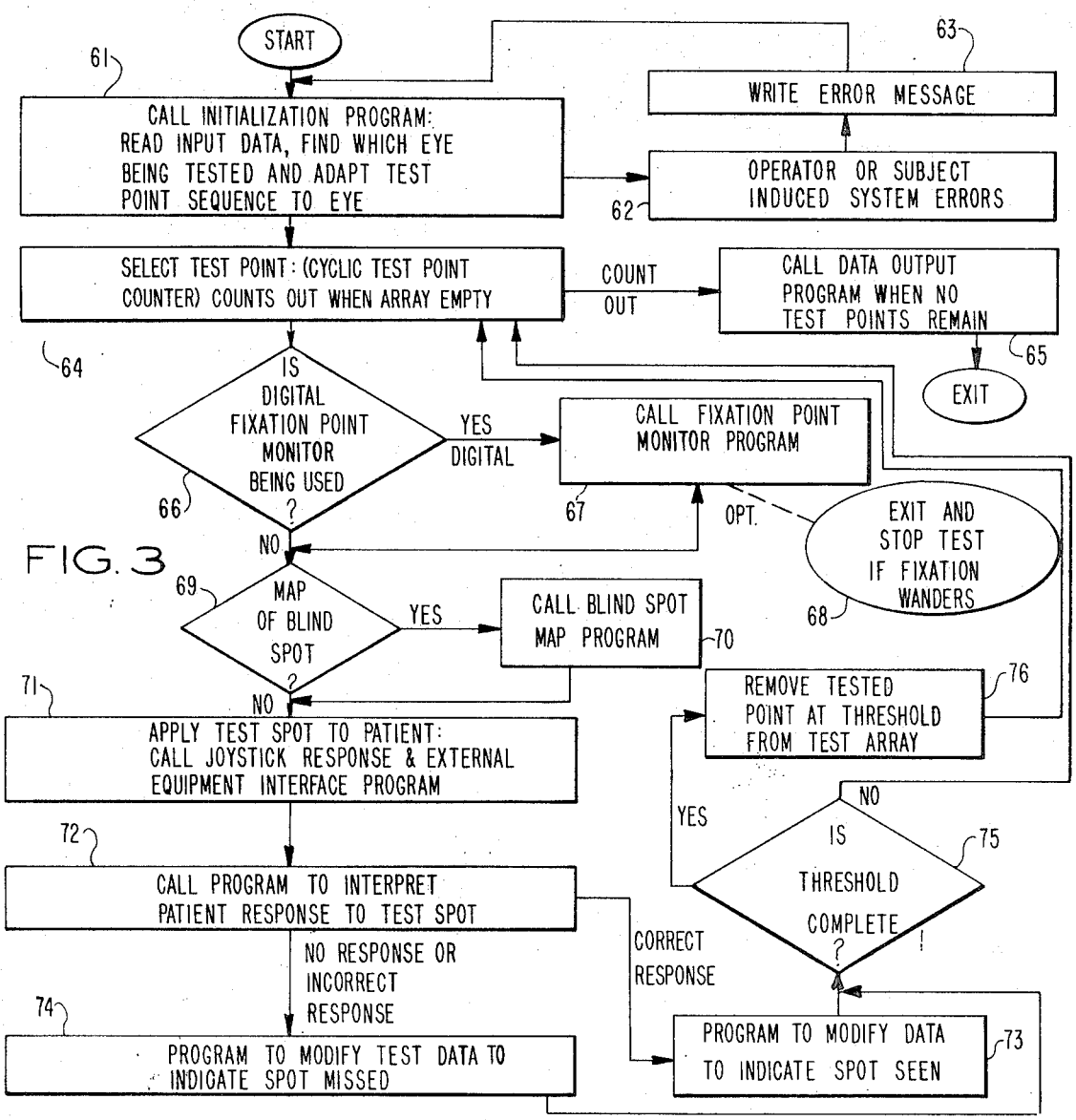

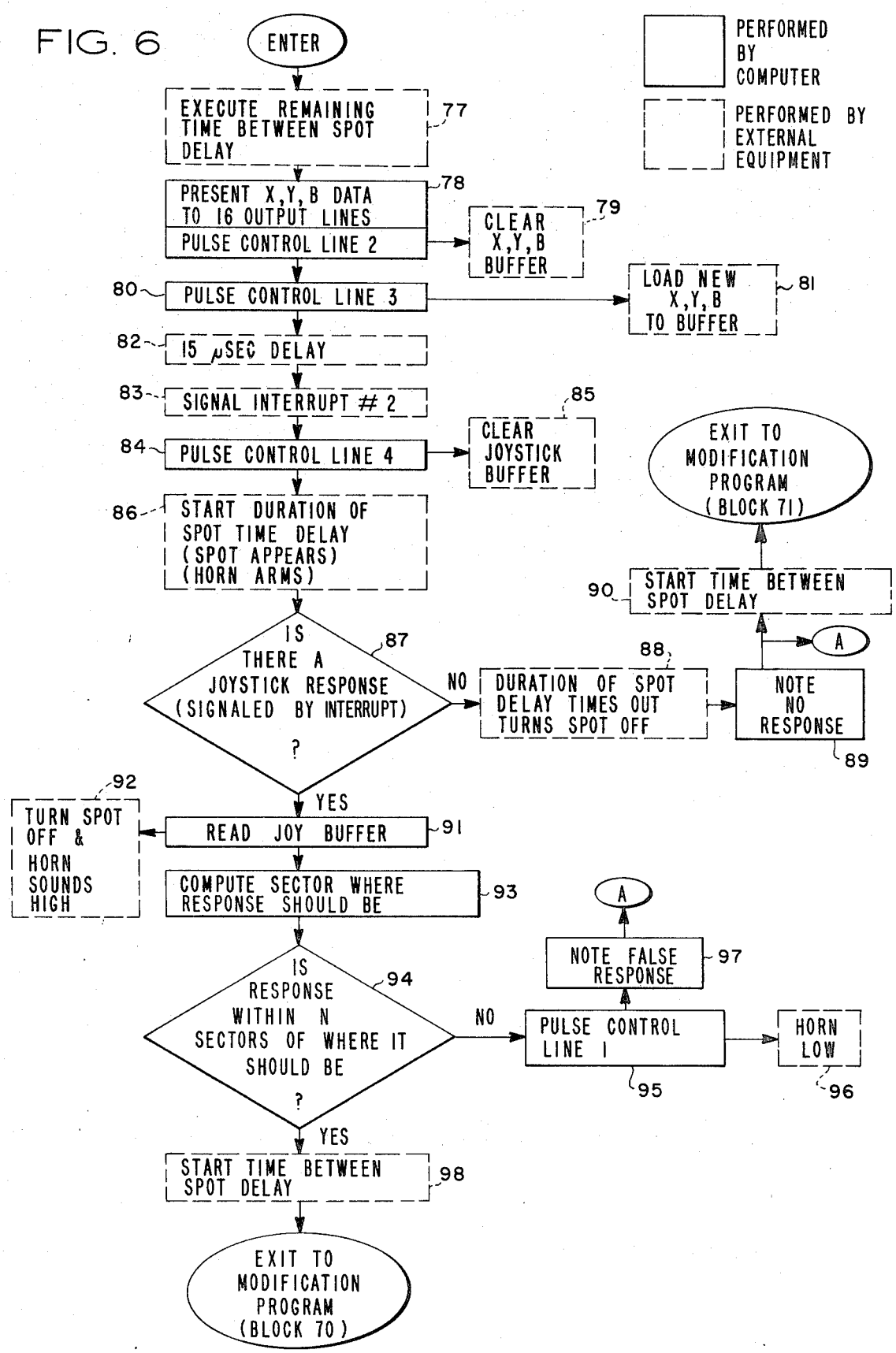

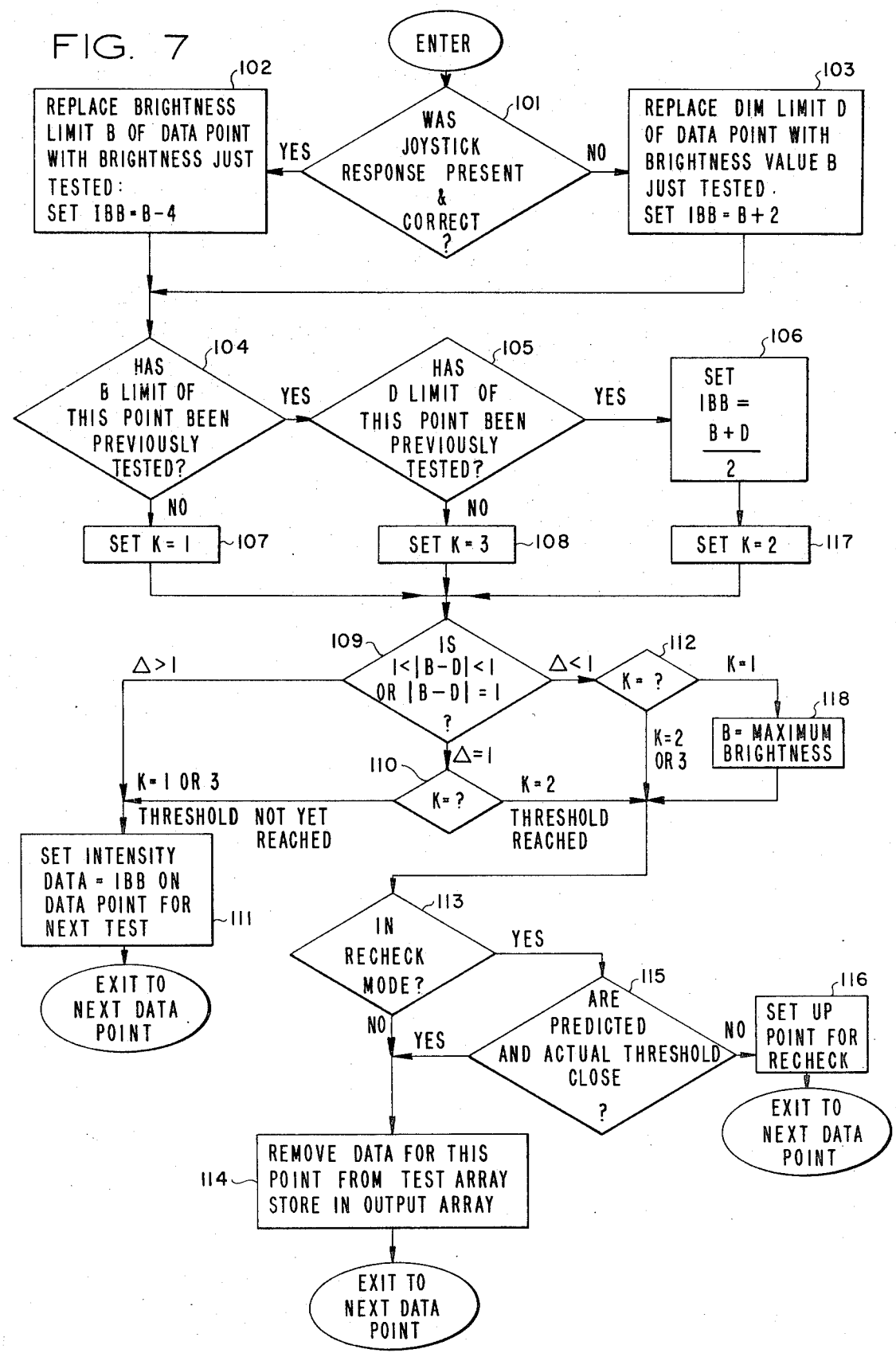

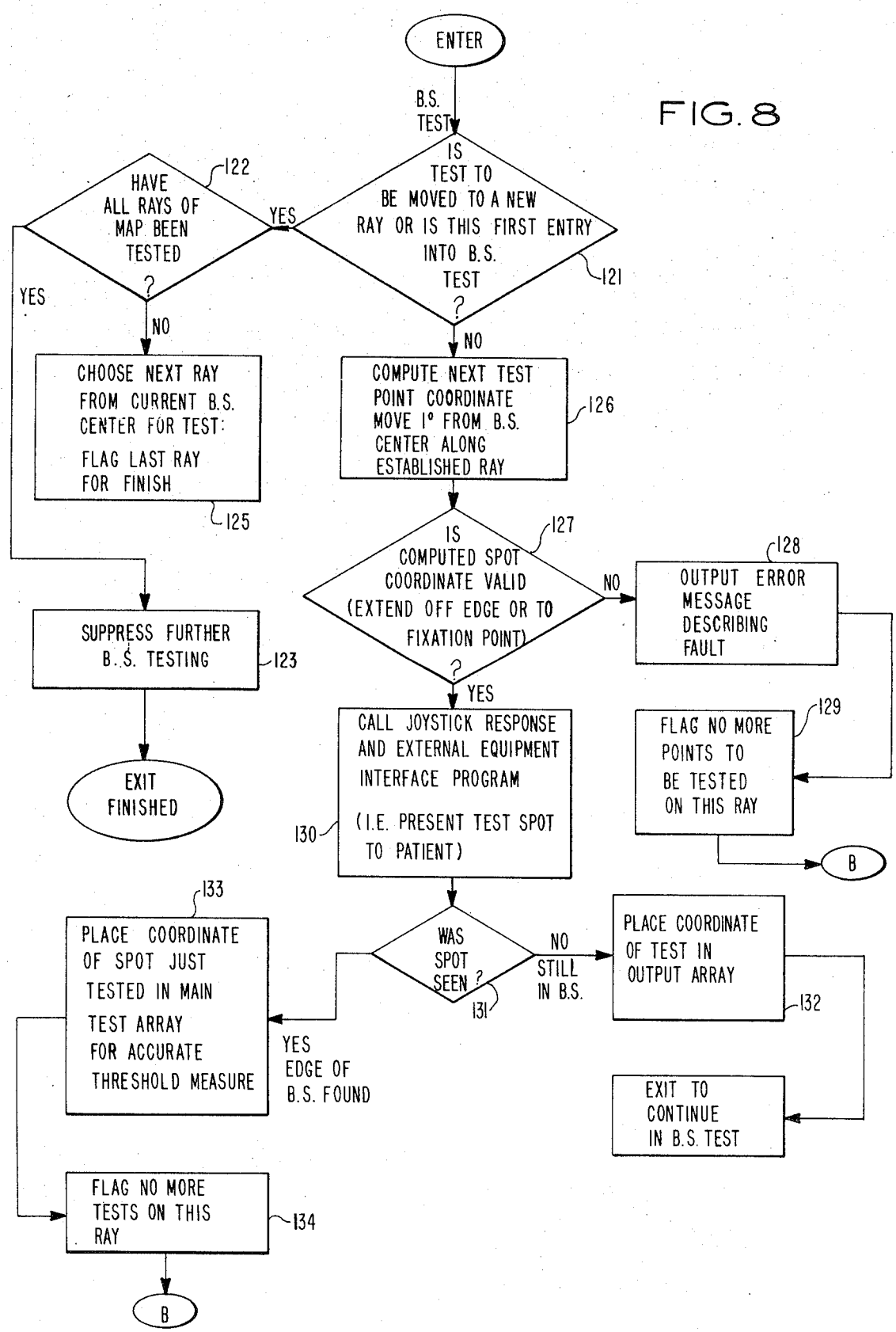

REGISTRY OF RETINAL IMAGE AND DISPLAY SCREEN WITH SHIFTED FIXATION POINT

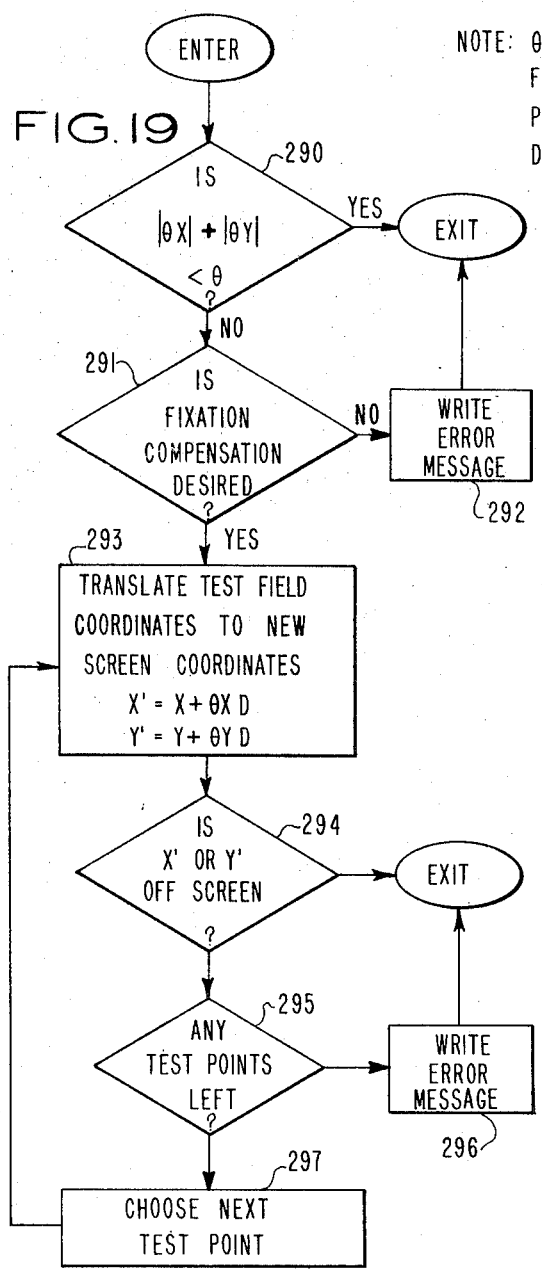
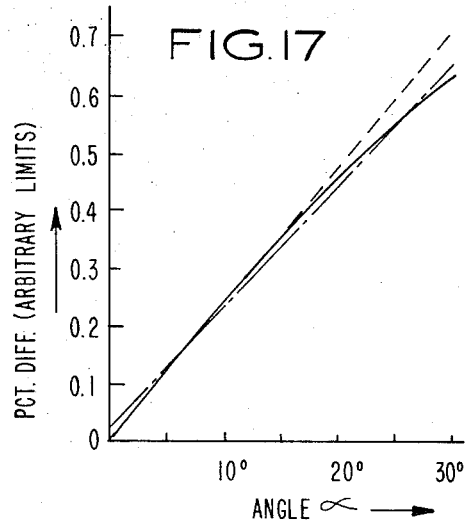
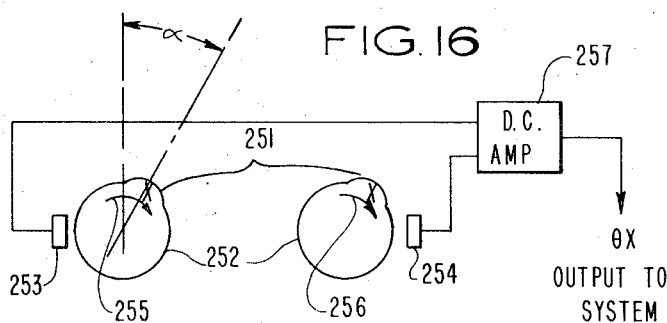

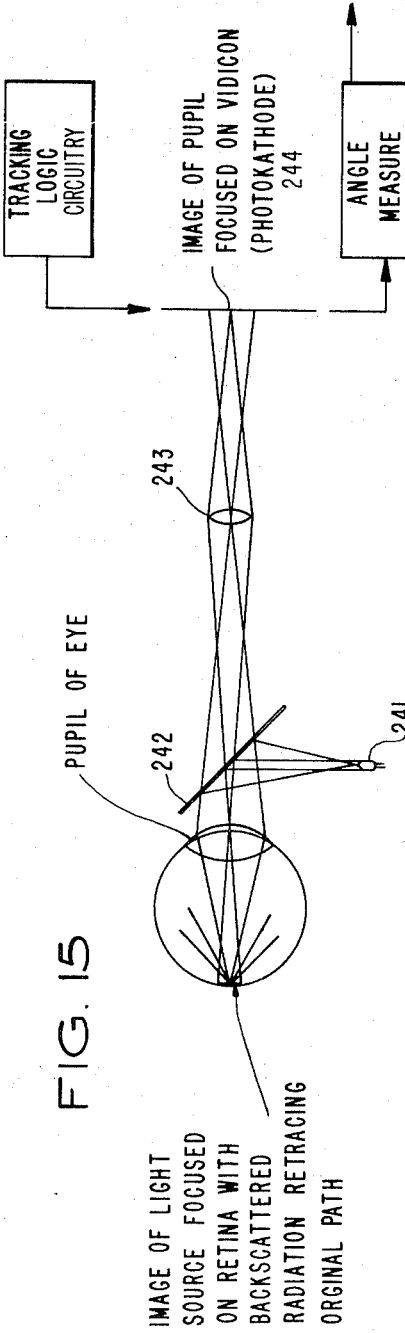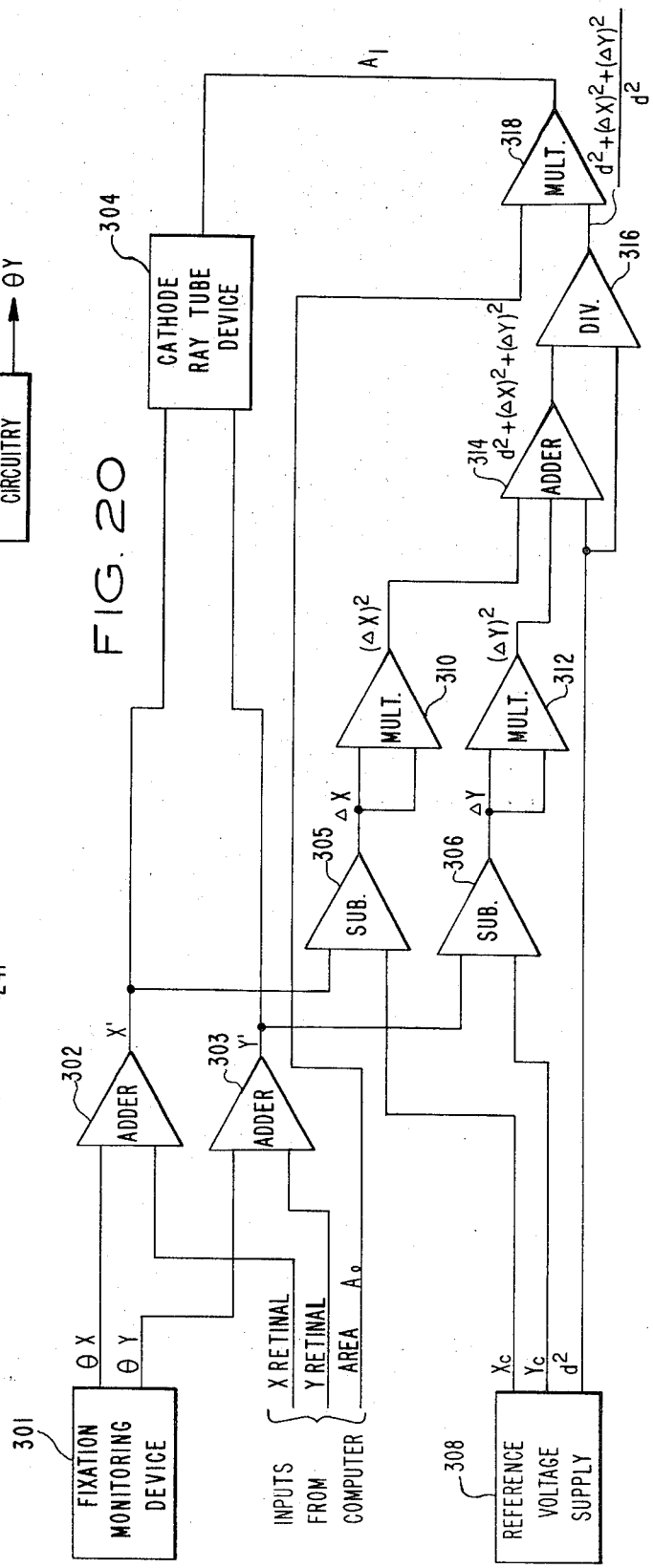
FIG. 15
FIG. 20

3,718,386
AUTOMATIC VISUAL FIELD EXAMINATION
INCLUDING FIXATION MONITORING AND
COMPENSATION
John R. Lynn, 10001 Preston Road, Dallas, Tex. 75230,
and George W. Tate, Jr., 19523 Dennis Lane, Farmers
Branch, Tex. 75234
Filed Sept. 17, 1971, Ser. No. 181,538
Int. Cl. A61b 3/00
U.S. Cl. 351—39
27 Claims

ABSTRACT OF THE DISCLOSURE

An illustrative embodiment of the present invention includes method and apparatus for determining the threshold value of visual stimuli presented at selected locations in the visual field of a subject. A programmed automatic data processing system is utilized together with a subject response device in a unique two-way feedback system to select location, brightness and spot size of stimuli (spots of light) to be presented and to present these stimuli on a test screen at locations which are unpredictable to the subject, with the term stimuli including test spots which are perceived and those which are not perceived. The subject communicates with the data processing equipment via the subject response device and the system interprets the responses to alter the stimulus presentation regime dynamically while communicating feedback to the subject of correct or incorrect perception of each stimulus. Eye movement of the subject is monitored and compensated for in the presentation of the spots of light by other system apparatus which also communicates with the data processing equipment to center the test field relative to the direction of gaze of the subject which is not necessaritly the center of the test screen or a fixed point.

BACKGROUND OF THE INVENTION

This examination relates to examination of the field of vision of a human patient and more particularly to automatically implemented methods and apparatus for examining the visual field of a human patient utilizing the principles of perimetry and campimetry.

The visual field of a subject or patient may be defined as the family of solid angles in which the patient may observe a given set of graded stimuli while his gaze is fixed at a point in space. More generally, if the fixed point in space just referred to (or direction of gaze) moves, then the visual field may be thought of as the family of solid angles in which a subject may observe a given set of graded stimuli at the instant that his gaze is directed at a particular point. Thus, the visual field remains essentially constant relative to any fixation point regardless of the direction of gaze of the subject if all other conditions are the same and extraneous antefacts such as the nose and the brow are ignored. Each solid angle or cone shaped section of space contained in this family is a function of the stimulus value as determined by the hue and luminance (color and brightness) if the spot of light relative to the hue and luminance of the background (contrast) condition of the subject's visual system and his psychological state. In a normal person a maximum stimulus may be seen over a lateral expanse of roughly 216° using both eyes, or 170° using a single eye. The methods of the present invention are concerned with measuring the visual field of a single eye.

Visual fields are important in the detection and diagnosis of diseases which affect the brain and the visual system. For this reason visual fields are important to ophthalmologists, neurosurgeons or other specialists who deal with these diseases. Visual fields also are of interest and use to the general practitioner in the management of diseases such as diabetes. In fact, all seven of the major causes or organic blindness in the United States (Glaucoma, Cataract, Diabetes, and other vascular diseases, Uveitis, Retinal detachment and Senile macular degeneration), have characteristic patterns of defect in the visual field. Measurements of the visual field of a patient which ar highly reproduceable from time to time in an objective manner are very valuable in detecting the progression of the above diseases and may be useful in determining the location of other physical defects such as pituitary tumors.

Visual fields have, in the past, been displayed by the use of isopter lines or lines of constant visual sensitivity which are drawn from the results of a manually conducted test. Manual testing which has been conducted in the prior art has usually been of two types, the kinetic and static methods. In both types, the steady gaze of the subject at a fixation point, generally located in the center of the test field, has been required. In the kinetic method, spots or stimuli of a known size and brightness are moved inwardly from beyond the edge of the peripheral vision of the patient until the subject signals in some manner to the examiner that he sees them. This method, while relatively fast, introduces a source of inaccuracy because of the reaction time lag between the subject's seeing the stimulus and his signal to the examiner. Kinetic visual field testing can also fail to detect relatively small blind areas within the visual field.

The static method of manual visual field testing has utilized stationary stimuli displayed at fixed points relative to the fixation point of the subject in the visual field. Starting and remaining at such a point, and initially utilizing an imperceptible stimulus value, the size and/or brightness of the stimuli are increased in steps with intervening pauses until the subject signals the perception of the most recent brightest stimulus. This establishes a threshold value at the test point selected, and the procedure is extended to a number of other selected locations in the visual field where the process again determines the stimulus which may just be seen. This method generally produces more accurate results than the kinetic method but has the disadvantage of requiring a relatively longer time to conduct a complete test. Moreover, the repetitive presentation of static stimuli in the same relative location in the visual field without adequate intervening pauses or, worse yet, the gradual brightening of a continuously presented stimulus will cause localized bleaching of the retinal pigment and/or neutral accommodation in the retinal area where the test spot is focused. This process, called local adaptation, may be avoided by delaying tests at the same retinal location until the eye has had time to recover from the previous test. A sequential display of stimuli at different fixed visual field locations eliminates this error source.

Due to the relatively long duration of the visual field test, the patient may lose interest and shift his gaze from the point of fixation. In previous testing methods this has reoriented the visual field and led to spurious test results as the test results are based upon an assumption that a single point of fixation was maintained as each stimulus was presented. Test results are merely deleted if the examiner becomes aware that the subject is not maintaining fixation. The present invention, however, by use of novel test methods and apparatus, monitors the orientation of the eye and presents test points reoriented to remain in the same relative position within the subject's visual field even if the gaze is shifted. The novel test system of the present invention feeds back information to the subject indicating a correct or incorrect response to a given stimulus while at the same time dynamically altering the presentation of stimuli to the subject in response to his reaction to previous stimuli.

With the present invention, inadvertent suggestion by the examiner is avoided through the pseudo random or unpredictable presentation of test stimuli at various locations in the visual field of a subject. This contributes markedly to the objectivity and reproducibility of the testing procedure. The unpredictable presentation of test points at relatively random locations in the visual field reduces the anxiety of the patient and maintains his interest. Time consuming rest periods which are necessary to counteract local adaptation of the retina are also avoided.

Accordingly, it is an object of the present invention to provide a method of examining the visual field of a subject which is implemented by automatic data processing equipment in combination with stimuli producing apparatus and apparatus for monitoring the direction of gaze of a subject.

Another object of the present invention is to provide a method for determining the visual field of a patient which maintains the interest of the patient by providing a two-way feedback system wherein the patient's responses dynamically alter the testing procedure while simultaneously informing the patient as to the correctness of such responses and which does not require the subject to maintain fixation upon a single, predetermined point when tests are presented.

Another object of the present invention is to provide an automatic method and apparatus for determining the visual field of a subject which is faster and more objective than methods known in the prior art and which is not affected by a change in the patient's direction of gaze.

A still further object of the present invention is to provide method and apparatus for determining the visual field of a patient whose direction of gaze may be changing during the test and recording the visual field in a form useful to the medical profession.

In accordance with the objects of the present invention method and apparatus are provided for determining and recording the visual field of a subject while monitoring and compensating for eye movement. The method, which is implemented by programmable automatic data processing equipment utilized in conjunction with peripheral testing equipment, is capable of producing accurate and reproducible results. A computer program is utilized to control the position, size, color and intensity of test stimuli which are presented at predetermined locations in the vsual field of the subject by appropriate peripheral equipment. The program determines the threshold level of a stimulus which the subject may detect at a given point in his visual field by presenting such stimuli of computed intensity to the subject in a pseudo random or unpredictable locations against a background field of substantially constant color and intensity. Eye movement of the subject is monitored and the relative location of the test points on the background field is dynamically altered to take into account a coordinate translation of the fixation point of the subject caused by eye movement. Movement of the head, excessive movement of the eye or blinking is detected to permit momentary interruption of the test.

The subject responds to the stimuli presented in the test field by indicating the relative position within his visual field at which a stimulus was seen. A manual response device, which may be referred to as a joystick, and which has two degrees of freedom is used to indicate the angular sector of the visual field in which the subject observed the stimulus. If the subject's response was correct within acceptable limits the system provides him with a reward in the form of a pleasant audible signal indicating that his response was accurate. An audible signal having a different and more unpleasant tone is used to indicate an inaccurate response. Simultaneously, the subject's response to a given stimulus is used in the system to control the size and intensity of subsequent stimuli presented at the same geometrical location in his visual field. This is done in such a manner that the threshold level of the subject at a given geometrical location within the visual field is determined in an efficient manner and with an alacrity not previously possible using manual tests.

In this manner visual field tests are conducted at any suitable number of points in a subject's visual field to allow an accurate determination of the shape of the visual field even as the fixation point of the subject changes. After all test points in the visual field have been examined, the system records or displays the output data in a form convenient for the use of the medical profession. Such output may comprise, for example, visual field maps having isopter or constant threshold lines.

The novel features of the present invention are set forth with particularity in the appended claims. The present invention, both as to its organization and manner of operation, together with further objects and advantages thereof may best be understood by way of illustration and example, when taken in conjunction with the accompanying drawings, in which:

FIG. 2 is a perspective view illustrating the general arrangement of certain elements of the apparatus relative to the subject being tested;

FIG. 3 is a flow chart of a test program in accordance with the preferred embodiment of the invention;

Figure 4:
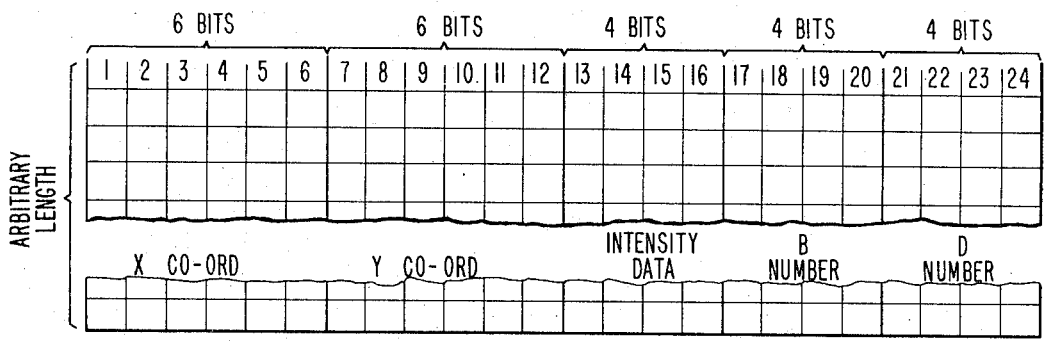
Figure 5:
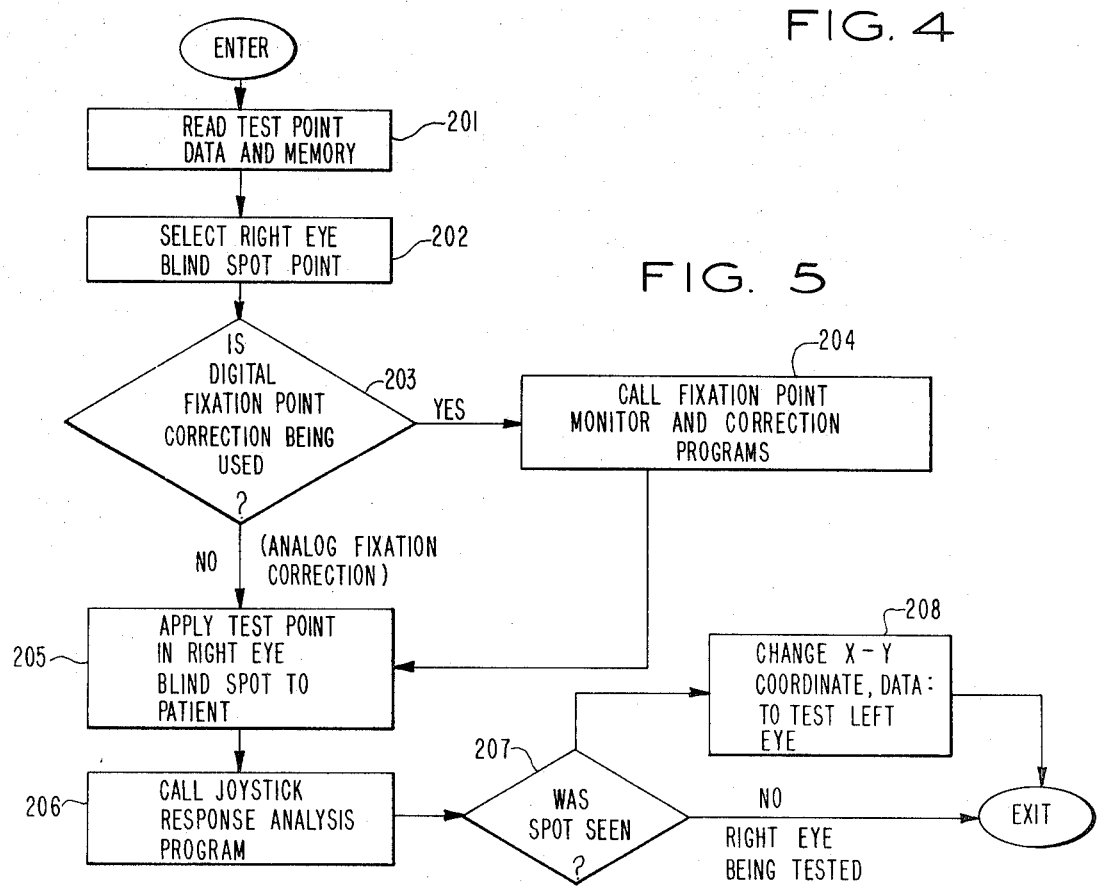
Figure 11:
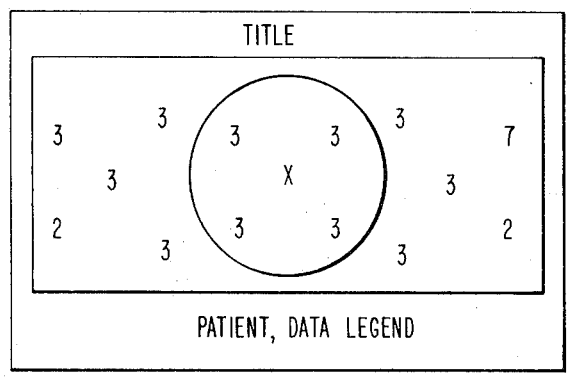
Figure 8A:
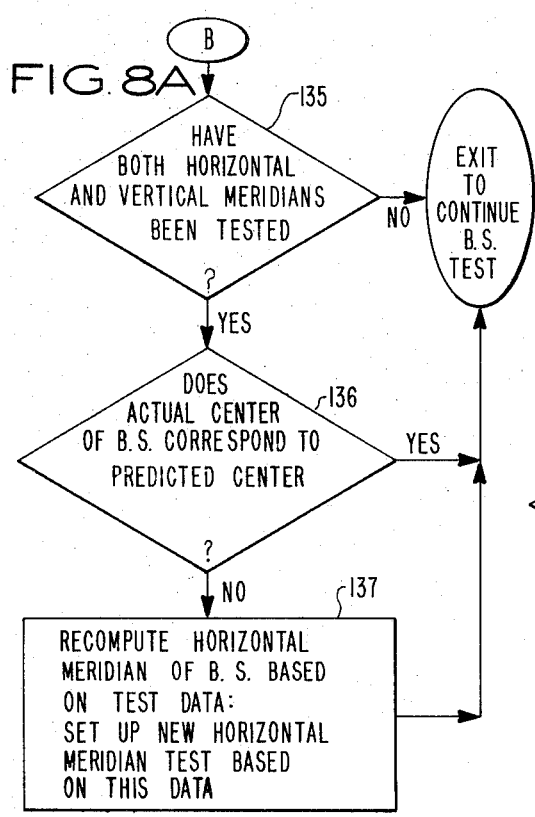
Figure 10:
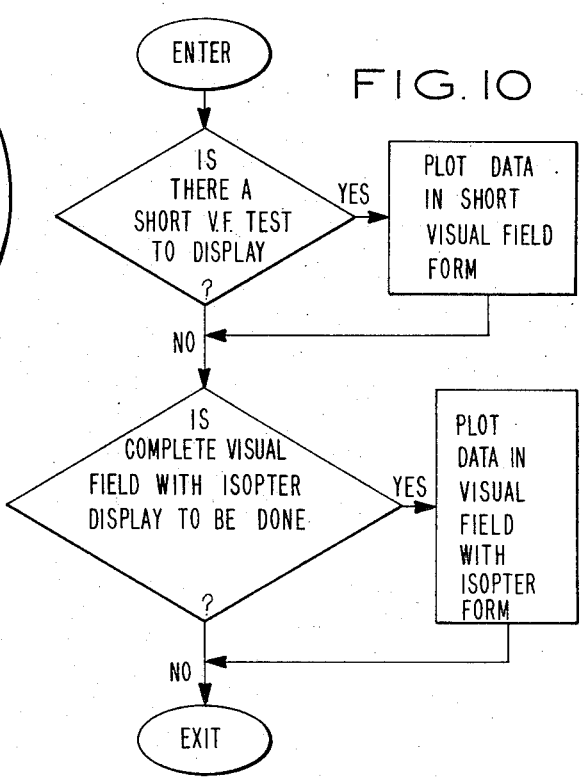
Figure 9:
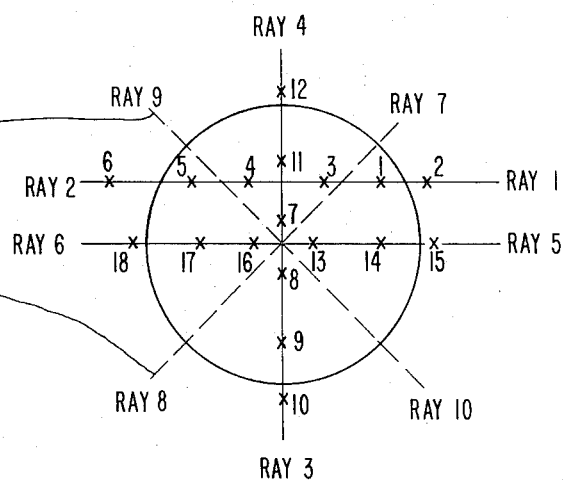
Figure 12:
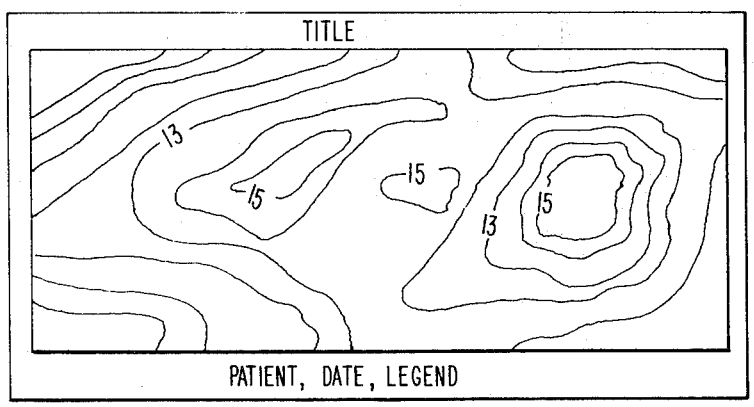
Figure 13A:
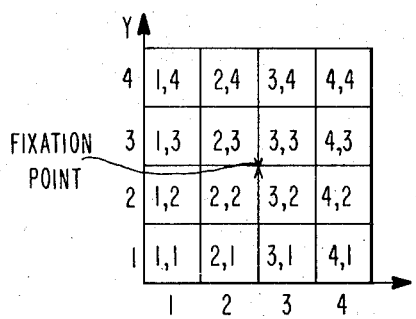
Figure 13B:
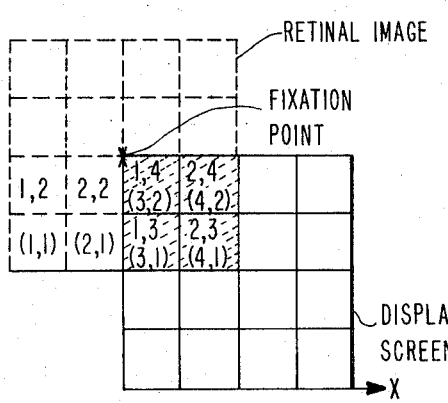
Figure 14:
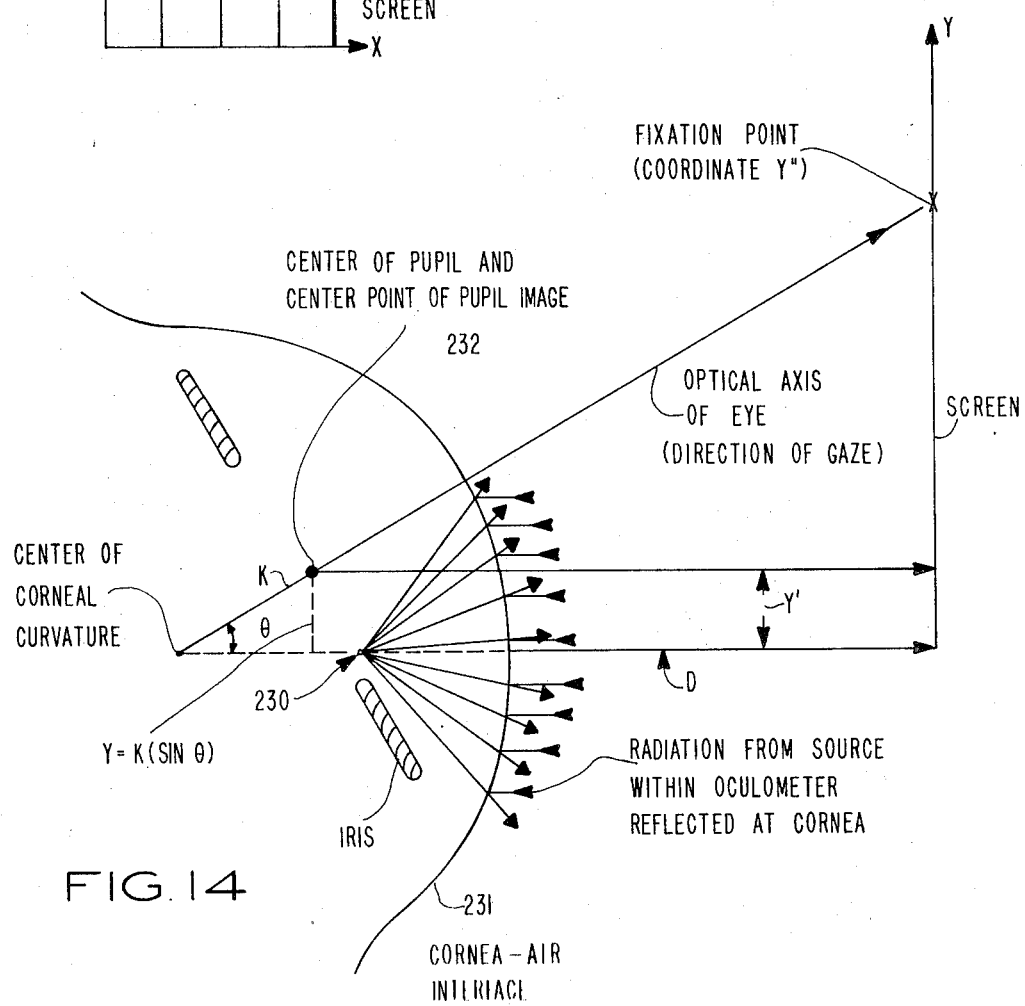

FIG. 4 diagrammatically illustrates a preferred format for the test point data;

FIG. 5 is a flow chart of an initialization program;

FIG. 6 is a flow chart showing the interrelationship between functions performed by the computer and the internal equipment during a test cycle;

FIG. 7 is a flow chart of subprogram to modify data points based upon the subject's response to the stimulus;

FIGS. 8–8a are a flow chart of a subprogram for testing blind spots;

FIG. 9 diagrammatically illustrates a preferred method of testing the blind spot;

FIG. 10 is a flow chart of a data output program;

FIG. 11 illustrates one type of output display;

FIG. 12 illustrates another type of output display;

FIG. 13a shows a simplified coordinate system relative to a single fixation point centered on a test field;

FIG. 13b illustrates the shift in the coordinate system as the fixation point moves relative to the test field;

FIG. 14 diagrammatically illustrates reflective patterns of columnated light impinging upon the eyeball;

FIG. 15 schematically illustrates an oculometer;

FIG. 16 diagrammatically illustrates use of electro-oculography for monitoring direction of gaze;

FIG. 17 is a graph showing the manner in which corneal-retinal potential varies as a function of angle of movement of the eye;

FIG. 18 diagrammatically illustrates use of four sensors to obtain information as to both horizontal and vertical angles of movement;

FIG. 19 is a flow chart of a subprogram for translating the screen coordinates of test points to be presented in the visual field; and FIG. 20 is a block diagram of apparatus using analog techniques for translating the screen coordinates.

DESCRIPTION OF THE PREFERRED EMBODIMENTS

The field of vision of the human eye is that part of space in which stimuli are visible during the instantaneous fixation of gaze in a particular direction. Referring initially to FIG. 2 of the drawings, the gaze of a subject 21 is fixed along a visual axis 22 in the direction of a fixation point 23 which is situated for the instant in question in the center of the screen 24 of cathode ray tube 25. The visual axis 22 is defined as a line joining the pupil of the eye and the point of fixaton 23. A mask member 27 having an aperture 28 therein preferably defines a head support (not shown) for positioning the patient's head a desired distance from the face of the screen 24 and relative to the aperture 28. If the visual axis is as indicated, then the face of the cathode ray tube device 25 lies within a portion of the visual field of the subject 21 subtending a horizontal angle of approximately 60° as illustrated. The mask member 27 and aperture 28 are utilized to permit only one of the subject's eyes at a time to view the face of the cathode ray tube device 25.

A coordinate system having x and y axes as indicated in FIG. 2 with the origin located at the lower left hand corner of the screen may be utilized to define locations in the visual field of the subject 21 by assigning two coordinate numbers x and y to any point on the screen 24 of the cathode ray tube device 25. Thus locations in the visual field of the patient may be quantized in a manner convenient for handling by automatic data processing equipment which is connected and programmed in a manner to conduct the test of the subject's visual field as will be hereafter described.

The method of visual field testing of the present invention contemplates the possibility that the location of the subject's fixation point (shown on 23 in FIG. 2) may vary during the test. This will change the orientation of the subject's visual field relative to the face of the cathode ray tube device screen 24. The visual field test need not be interrupted because of this, however. By providing some form of fixation monitor coordinate translation of the subject's direction of gaze may be taken into account in the visual field test. One such device, which will be discussed in more detail subsequently, is shown schematically in FIG. 2 as an oculometer 34. Of course, other fixation monitoring devices such as an electro-oculograph monitor which uses skin electrodes (not shown) attached to the mask member 27 could be used, as will be subsequently discussed. In the case of the oculometer device, 34 of FIG. 2, half silvered mirrors (or beam splitters) 32 and 33 could be used. In practice, the mirror 32 is positioned between the subject's eye and eye piece in order to cover the entire visual field without being of large size and to prevent interference between the optics of the oculometer and corrective lens placed in the eye piece 20. Oculometer 34 contains a source of illumination 35 and a reflected radiation monitor 36 to track eye movement and provide data on it to correct the test regime for its effect. Although the beam splitters only transmit a portion of the light from stimulus presented on the screen to the eye of the subject, his performance in the visual field test is not affected significantly as the percentage of light reflected is constant and compensation can be made.

To the right of the computer driven cathode ray tube device 25 and oculometer 34 in FIG. 2 is a control panel 29 which is illustrated schematically. Control panel 29 has a plurality of toggle switches 30, or the like, which may be used by the examiner to indicate conditions of the test or to input data to the automatic data processing equipment. A manual response device 31 is situated between the masking apparatus 27 and the face 24 of the cathode ray tube 25 within convenient reach of the subject 21. During the course of the visual field examination the subject 21 communicates with the automatic data processing system by the use of this manual response device. Details of the operation of the manual response device 31 will be discussed subsequently.

It is important to note that communication between the subject and the automatic data processing system can be obtained in other ways. For example, an electroencephalograph (EEG) can be used to monitor the evoked cortical potentials in the occipital cortex which occur in response to a visual stimulus of sufficient magnitude and indicate to the processing system that a stimulus was seen. An electroretinograph or a pupilometer will provide a similar function but do not test all neural connections to the brain. Detection of a visual response by having the subject look in the direction of the spot is also possible. While not shown in the drawing of FIG. 2, it will be understood by those skilled in the art that any corrective, refractive lenses required are placed between the eye of the subject 21 and the face of the cathode ray tube 25, such as in the eye piece 28, to correct for refractive defects which the subject 21 may possess.

One type of examination to measure the extent to which the normal eye can detect the presence of objects which are off the visual axis may be referred to as perimetry. Large or relatively bright test objects may generally be seen at locations having coordinates quite eccentric from the fixation point. On the other hand, small objects or those with low contrast in comparison with the background usually cannot be seen until their angular distance or eccentricity from the visual axis is relatively small. In an examination by perimetry, the distance from the test stimuli to the eye is maintained constant (i.e., test stimuli are presented on the surface of an arc or hemisphere centered at the eye). Campimetry is a method similar to perimetry for measuring the visual field in which test stimuli appear at distances from the patient's eye proportional to the minimal eye-screen distance by the secant of the angle of eccentricity. That is to say, a testing apparatus such as shown in FIG. 2 is a campimetry device since the surface upon which the test stimuli are displayed is a plane surface, and hence, objects near the edges of the test screen 24 are a short distance further from the eye of the subject 21 than stimuli presented near the center of the screen. This, of course, slightly affects the size of the stimuli aes they appear to the test subject. Both perimetry and campimetry are valid tests and may be used equally well to examine the visual field of a subject. It is, however, difficult to compare results of these different types of tests quantitatively. The present invention utilizes the principles of static perimetry or campimetry in which stationary stimuli are presented at various selected locations in the visual field of the subject. The stimulus value or size and brightness of these stimuli may be varied and as previously discussed, the order in which they are presented to the subject is preferably varied in an unpredictable manner. Moreover, as the direction of gaze of a subject changes the campimeter (or plane surface) device display used in the present invention must be corrected for the size effects that coordinate translation of the fixation point will have on the stimuli presented in the visual field of the subject. The use of the fixation monitor equipment can be made to take this into account as will be discussed in more detail subsequently.

The threshold value of a point in the visual field of a subject may be defined as the degree of stimulus just required for perceptural response in the test area. For a stimulus to qualify as the threshold of static perception, the response to a given stimulus value must be coupled with the failure to respond to a second stimulus value which is one quantized step dimmer than the intensity of the stimulus which was seen. A form of recording the visual field which is useful is a record of the numerical threshold values at selected points in the visual field.

In the present invention an automatic data processor or digital computer completes a two-way feedback loop between the test subject and the test regime or routine. In this two-way feedback system the test regime itself may be updated based on the response to the subject. By use of an audible subject response indicator, the subject is provided with an indication of success or failure in responding to the stimuli presented. A pleasant tone is presented to the subject for a correct response while an unpleasant tone indicates an incorrect response. This feature helps to sustain motivation of the test subject, as well as increase the precision of his response. Motivation is an important psychological factor to obtain accurate results in visual field testing.

In perimetry or campimetry the degree of fixation or the ability of the patient to maintain his gaze at a fixed point has been crucial in performing a valid examination. The present invention may be utilized to provide a test of the visual field which does not require perfect fixation. This eases the stringent psychological requirement on the subject to fixate, improving test results. Eye movement of the subject can be monitored and taken into account in the testing regime by the use of proper equipment.

Referring to FIGS. 13a and 13b the effect of the shift of a subject's fixation point is illustrated in a simplified 4 x 4 coordinate system where coordinates in parenthesis denote visual field coordinates and test field and the coordinates of the test screen are not in parenthesis. In FIG. 13a it is assumed that the subject's fixation point exactly coincides with the center of the test screen being used to perform the visual field test (i.e., such as CRT screen 24 of FIG. 2). A test point on a test field which is centered relative to the direction of gaze of the subject has coordinates which correspond with the coordinates of the test screen. That is to say, with the gaze directed toward the center of the screen, the coordinates of a test point in the test field are defined precisely by the corresponding test screen $x$–$y$ coordinates described previously and illustrated in FIG. 13a. Now if the direction of gaze shifts to a different fixation point (as in FIG. 13b) then the coordinates of the test screen no longer coincide with the test field coordinates, which shifts so its center remains at the location of direction of gaze. Thus, a point which was, say coordinate (4, 1) in the test field and 4, 1 on the screen, now becomes coordinate 2, 3 on the screen while remaining coordinate (4, 1) in the test field. It should be noted that in this instance the $x$ coordinate is decreased by 2 and the $y$ coordinate is increased by 2. Similarly, coordinates (3, 2) in the test field become 1, 4 on the screen, coordinates (4, 2) become 2, 4, etc. The corrected location of points in the test field on the screen when the direction of gaze is away from the center of the screen is thus determined merely by translating the test point coordinate (in the screen coordinate system) by an amount equal to the translation of the direction of gaze. Of course an extreme translation of the direction of gaze could result in some of the test points in the test field lying outside the screen area. If more than a desired percentage of the test points lie outside the screen area, it is possible to signal the subject in some manner to return his direction of gaze to within acceptable limits on the display screen and/or to halt the test procedure until such is accomplished.

There are alternative methods possible for monitoring the screen coordinates of the direction of gaze. One such, the oculometer system, has been discussed briefly with respect to FIG. 2. A system of this type will now be described in more detail with respect to FIGS. 14 and 15. Referring now to FIG. 14 (and considering only a one dimensional translation of the fixation point on the screen of an image dissector tube, say in the Y coordinate direction) the geometry involved in following the eye movement is shown. The basic measurement principle of an oculometer is that eye direction is defined by the position of the corneal reflection of a light source relative to the center of the pupil of the eye. Assuming that the eye is illuminated along an axis as shown by a point source of light effectively at infinity (not shown) and is imaged by an optical system with a collection aperture optically coincident with the light source, the reflection of some of the incident, collimated radiation at the cornea-air interface 231 forms a virtual image 230 of the point light source which lies approximately in the plane of the pupil. For each individual eye, the displacement Y of this virtual image relative to the center 232 of the image of the eye pupil, as measured by the image dissector tube, is proportional to the coordinate Y of the direction of gaze on the screen. The displacement of this virtual image of the point source from the center of the eye pupil image is given by $$Y = K \sin \theta$$

where K is the distance between the plane of the iris and the center of curvature of the cornea and $\theta$ is the angle between the optical axis of the eye and the direction of the incident radiation. The quantity K can be determined as a calibration of the oculometer for a given individual at the beginning of the test, by having the subject fixate on at least one and preferably several points with known coordinate, one of which is the center of the screen. Once this calibration has been made, then the angle $\theta$ may be measured. Once the angle $\theta$ is known, since the screen is situated a known distance (D in FIG. 14) from the subject, the fixation point coordinate $Y^{11}$ may be determined from the relation $$Y^{11} = D \tan \theta$$

For small angles the relationship $$\sin \theta = \tan \theta = \theta$$

will be nearly correct. Thus for purposes of selecting coordinate translations, once the calibration constant K is known, then the coordinate $Y^{11}$ of the displaced fixation point may be computed as (for small angles $\theta$)

$$Y^{11} = D\theta$$

This approximation is good for angles less than 10 degrees. It will be appreciated that the more precise trigometric function is required for larger angles. A similar analysis is applicable to displacement along the X axis and if $\theta_x$ is the angle denoting the angular displacement of the direction of gaze along the X axis and $\theta_y$ that along the Y axis then $$y^{11} = D\theta_y$$

$$y^{11} = D\theta_x$$

An oculometer for monitoring eye movement and operating on the principle just described is commercially available from the Honeywell Corporation of Boston, Mass. Such an oculometer is illustrated schematically in FIG. 15. In the oculometer of FIG. 15 the eye is illuminated by a light source 241, which may, for example, comprise an infrared source so as not to distract the subject from the visual field examination, via a beamsplitter 242 (as shown in FIG. 2). The refractive media of the eye (primarily the cornea and the lens) transmit the light to the retina. Radiation backscattered from the retina illuminates the pupil. An image from the illuminated eye pupil is focused onto the photocathode 244 of a vidicon tube or the like (not shown) by a lens 243. An electronic system including tracking logic to follow the source image on the pupil image (not shown, but a part of commercially available oculometer) then serves to measure the angles $\theta_y$ and $\theta_x$ discussed previously and to provide output signals in digital or analog form as desired which are representative of these quantities. These quantities may then be used as will be described subsequently to correct or remove the effects on the visual field examination of the change in the subject's direction of gaze.

Alternatively, the direction of gaze may be determined, perhaps somewhat less accurately but with sufficient precision for visual field testing, by utilizing the principles of electro-oculography. This technique is based on the fact that a D.C. potential difference exists between the corneal surface (at the front of the eye) and the posterior vascular layer of the eyeball. This potential is known as the corneo-retinal standing potential and is illustrated in a highly schematic manner in FIG. 16 which shows the corneal portion 251 of the eyeballs having a positive potential with respect to the posterior or retinal portion 252. This standing potential varies from person to person somewhat but has been observed to be as great as 1 millivolt in some individuals and as small as .30 millivolt in others. A value of .50 to .70 millivolt may be regarded as typical for the corneo-retinal standing potential.

Electrodes 253 and 254 situated as shown in FIG. 16 can be used to monitor eye movement in a horizontal plane by measuring variations in the electric field surrounding the eye produced by the corneo-retinal standing potential. For example, suppose that the eyeballs illustrated schematically in FIG. 16 rotate in a horizontal plane in the direction indicated by the arrows 255 and 256 through the angle α. This would bring the positive corneal surfaces of the eyes closer to electrode 254 and similarly bring the negative posterior regions closer to electrode 253. This would increase the potential difference between the two electrodes from its initial value before the eye movement. The algebraic sign of the movement is also indicated by the direction of the potential difference change as measured at the electrodes. A typical graph of the voltage produced in this manner by eye movement as a function of the angle the eyeball moves is shown in FIG. 17.

In FIG. 17 the voltage between electrodes 253 and 254 is plotted as a function of the angle of movement α. In the strictest sense this voltage has appeared to be function of the sine of the angle α for some patients while appearing to be a linear function of the angle for others. In a practical sense, however, the assumption that the voltage generated by the corneo-retinal potential due to eye movement is a linear function of the angle through which the eye is rotated is valid for the case of small angles (less than 30°) which can be tolerated in correcting for direction of gaze changes in the system of the present invention.

The D.C. amplifier 257 of FIG. 16 is used to amplify this relatively small voltage and the resultant output may be calibrated for a given individual at the beginning of the visual field test to provide the $\theta_x$ data previously discussed which is needed to compute the relative coordinates of the fixation point on the test screen. Similarly, a second vertical set of electrodes 260 and 261 of FIG. 18 can be used in conjunction with the horizontal electrodes 262 and 263 to measure vertical eye movement and the amplified voltage thus derived can be used to provide the $\theta_y$ output as previously discussed. Because of the individual variation in the corneo-retinal standing potential, calibration of such an electro-oculographic eye movement monitor would be necessary at the beginning of each visual field test. Of course, this may easily be accomplished as previously discussed in the case of the oculometer by using fixation points separated by a known distance or angle on the test screen. In practice, only three electrodes are used, and as is well-known in the art the potentials from the three electrodes can be used to derive both the $\theta_x$ and $\theta_y$ outputs.

The electrodes used to measure the eye position in this technique could be placed on the masking screen 27 of FIG. 2 if desired, or could alternatively be attached to the subject's skin by adhesives and connected to the remainder of the system by flexible leads. In either case it is desirable to have a good skin electrode contact as the voltages being measured are relatively small. Using this technique it is possible to determine the eye orientation to an accuracy of about 1 degree. This provides accuracy sufficient for fixation point monitoring in the visual field test.

Figure 1:
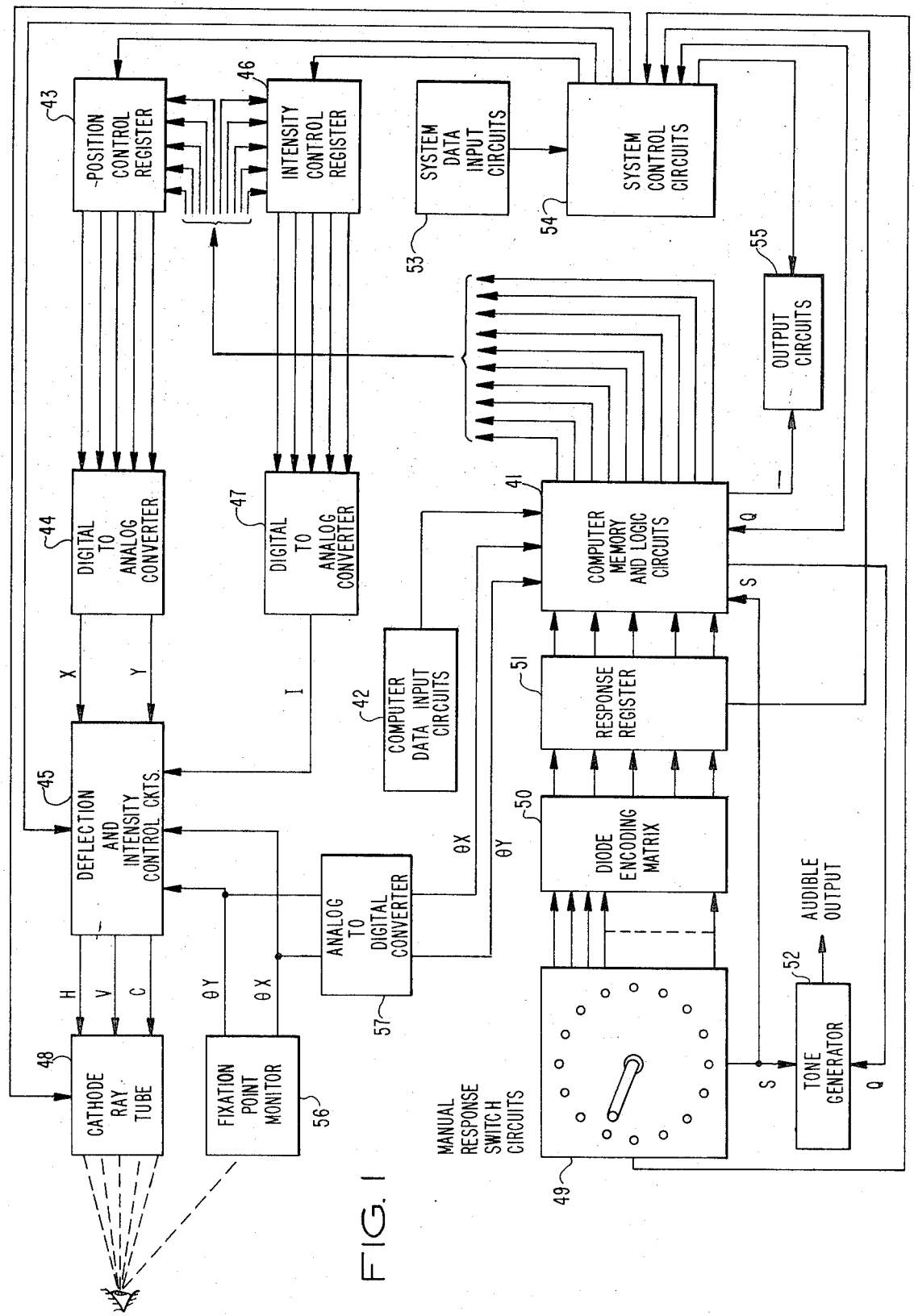
FIG. 1 is a block diagram illustrating apparatus in accordance with the preferred embodiment of the invention.

Referring now to FIG. 1, the overall system of the present invention is shown in block diagram form. The "backbone" of the system is an automatic data processor or general purpose digital computer 41. The computer 41 may be any of a suitable variety of small general purpose machines such as an IBM 1130 series computer or a hand wired, special purpose computer could be used. Alternatively, the system of the present invention could be used in time-sharing mode on a large scale computer system if desired. In this mode a plurality of systems having an external hardware configuration such as shown in FIG. 1 could be located remotely, say in doctors' offices, and procesed in parallel by a single large computer. In any case the computer 41 communicates to the external world and to the subject patient via a plurality of external devices. For example, the computer data input circuits 42 may comprise any of a variety of input devices such as a tape reader, card reader or typewriter, etc. Outputs or commands in the form of digital numbers from the general purpose digital computer 41 are supplied on a plurality of data lines to the external testing equipment. For example, the x–y screen coordinates of a test spot at which a stimulus is to be generated can be provided from computer 41 to a position control register 43 in the external equipment. The contents of position control register 43 are converted to analog form by digital-to-analog converter 44 and are supplied as a pair of analog signals to appropriate deflection control circuit electronics 45. The operation of such analog position control circuitry may be similar to that of a conventional television set as known in the art or that used in digitally controlled conventional CRTs.

The intensity control register 46 receives digital outputs from computer 41 and its contents are converted to analog form by a second digital to analog converter 47 which presents the intensity control signal in analog form to the intensity control circuits 45. Deflection and intensity control circuit unit 45 utilizes the three analog input signals along with optional $\theta_x$ and $\theta_y$ analog signals from the fixation point monitor 56 to provide a spot or test stimulus at the requested coordinates and with the requested intensity on the face of the cathode ray tube 48. The apparatus thus provides test stimuli to the subject under program control of the computer 41. The fixation point monitor 56, preferably provides analog correction information to the deflection and intensity control circuit 45. Digital correction information is also provided via analog to digital converter 57 to the computer 41. This digital information can be used in the program as will be described subsequently to determine if the direction of gaze is within acceptable limits on the screen and if the test spot to be presented would fall at an appropriate location, and to cancel the test if either is not acceptable. Digital correction information can also be used to provide correction information to converter 44, and thereby correct the deflection circuits. More precise control can be obtained by applying the analog information from the monitor 56 directly to control circuit 45, and is preferred.

The subject completes the test loop by responding manually via the manual response switch circuit 49. This manual response circuit is also referred to herein as the "joystick." Operation of the manual response device does two things. First, the sector or angular arc in which the joystick contact is completed is encoded in digital form by a diode encoding matrix 50 and supplied to a digital response register 51. The digital response register 51 in turn, may be sampled selectively by the computer 41 under program control. Secondly, operation of the joystick 49 acts to start tone generator 52 to produce an output. As will be described subsequently, the pitch of this audible output is changed between different levels for indicating to the subject whether his response to the test stimulus was correct or incorrect, i.e., sufficiently prompt and precise in direction.

Conditions of the testing may be controlled by the system operator through the use of the switches 30 of panel 29 of FIG. 2. These switches correspond to the block 53 labeled "system data input circuits" in the drawing of FIG. 1. These switches may be used to control system parameters such as the duration of the test spot and the time between applications of test stimuli to the subject. Other system parameters such as whether to recheck the threshold level at positions in which the measured threshold differs more than a preset amount from a predicted threshold level may also be controlled by positioning these switches appropriately. Such is desirable to prevent errors due to lack of patient attention or other factors. Switches on the console can also determine whether fixation point correction will be applied should the subject's direction of gaze vary during the test and the accuracy of patient response required. The switch positions are encoded as digital numbers by the system data input circuits 53. The system control circuits 54 are rendered responsive to the output of the data input circuits 53 and allow the computer 41 access to the status of the switch settings.

The system communicates with the operator and the outside world through the use of output circuits 55. The circuits may comprise any of a variety of computer output display or record devices such as a cathode ray tube, a graph plotter, a line printer, a typewriter, or other desired device capable of converting the computer output to a form usable in the external world. The system control circuits 54 are also in communication with computer output circuits 55 so that the status of the system may be monitored by the operator.

In operation, the system of FIG. 1 is set in motion by the operator through the computer data input circuits 42 and the system data input circuits 53. These data input circuits are utilized together with the program control of the digital computer 41 to generate test stimuli on the face of the cathode ray tube 48 via position control register 43, intensity control register 46, their associated digital-to-analog converters 44 and 47, the fixation point monitor device 56 and the deflection and intensity control circuits 45. When a stimulus is presented the patient responds indicating the angular sector of the test field (denoted by the dotted line wedges of FIG. 2) where the stimulus was observed via the manual response device 49. The subject's response is rendered in form usable to the computer 41 via the diode encoding matrix 50 and response register 51. A suitable response feedback (correct or incorrect) is supplied to the patient via the tone generator 52. The response of the subject is then dynamically used in the program to alter the testing process. When the testing is complete, as determined by the program, output circuits 55 under program control sample the status of the system control circuits 54 and the visual field data generated by the test and render these data to a form usable by the examiner. Thus the system of the present invention provides attention maintaining audible feedback to the test subject and dynamically varies the testing process while conducting a visual field examination utilizing the principles of campimetry under the real time control of the digital computer 41.

Referring now to FIG. 3, the overall method of the present invention as implemented by the real time computer program of digital computer 41 is illustrated in a macro flow chart. Details of this overall method will be discussed subsequently with respect to the other flow charting figures. Generally, the examination is started by the operator when the input test data is supplied, for example, in card form, to a card reader comprising a portion of the computer data input circuits 42 of FIG. 1. The system input circuits 53 of FIG. 1 having been previously set to the desired conditions for the test, the computer 41 is placed in operation and performs the visual field examination under control of the program. The first step in the program as indicated in block 61 of FIG. 3, is to call an initialization subprogram which reads the input data, discovers which eye is being tested and adapts the input test point sequence to the particular eye. At this point it is possible as indicated in block 62 to discover operator and/or subject induced errors. In this case an error message is written as indicated at box 63 and the program awaits correction of the error then loops back to block 61.

Assuming that the input data has been adapted to the eye being tested, a test point is selected at random from the test point array. The selected test point, as will be explained subsequently, is kept in computer memory in visual field coordinates. That is to say its coordinates are stored relative to the direction of gaze of the patient. Based upon the input from the fixation monitoring device 56, which may be of either of the two types previously described, the program then determines at block 66 whether the operator has decided via the switches 30 and system data input circuits 53 to have the programs control the fixation monitoring. If the program control option has been executed the inputs from the fixation monitor 56 are used at block 67 to translate the test field coordinates to screen coordinates. It should be noted here that it is possible at this point to exit the program if the direction of gaze has wandered so far that it would jeopardize the validity of the visual field examination. An example of this would be if the gaze wandered sufficiently far from the center of the screen to preclude truly random presentation of stimuli. It is for this reason that it is most practical to require that the gaze remain within 10 degrees of the center of the screen. This is indicated in FIG. 3 by the dotted lead line and exit 68. Assuming no further problem with fixation, the remainder of the program function will be described generally.

Test points are repetitively presented from the input data array until all test point thresholds have been determined. When all test point thresholds have been determined a data output program is called as indicated at block 65 and the test is complete. A program option which may be controlled, for example, by the switches 30 discussed previously, is a map of the patient's normal blind spot. Each normal eye has a generally elliptically shaped blind spot. The right eye blind spot is to the right of the fixation point and the left eye blind spot is to the left of the fixation point. If, as decided at block 69 the blind spot is being mapped, at block 70, a subprogram is called which performs a test on a single point in the blind spot area. Subsequent points in the blind spot area are randomly intermingled with points in the preselected test array to reduce patient anxiety. Assuming that the blind spot map is finished or that this option is not desired, the decision at block 69 is no, and a stimulus from the visual field array is then applied to the patient by calling a subprogram as indicated at block 71. This subprogram (to be discussed in more detail subsequently) applies the test point data via the previously discussed external equipment to the subject and registers his response.

Another subprogram which interprets the patient's response to the test stimuli is called as indicated at block 72. If the patient's response was affirmative or is interpreted to be correct, the data is modified to indicate the spot was seen, as indicated at block 73. If the subject's response was incorrect or if he did not respond within the allotted time, then the program performs the appropriate modification of the test point data to indicate the spot was missed as indicated at block 74. In either event the program continues to block 75 where it is determined if a threshold has been reached. If so, this data point is removed from the test (block 76) and placed in an output buffer for later display. The program then loops back to continue the testing sequence by selecting a new test point from the test array at block 64. Finally, as stated previously, when all test points have been exhausted the visual field examination is complete. At this point the visual field data output is provided to the examiner in a desired format.

Referring now to FIGS. 4 and 5, the functioning of the initialization subprogram called in block 61 of FIG. 3 is described in more detail. As previously stated, an array of test points is entered to the system by the operator by placing input data into the computer data input circuits 42 of FIG. 1. This input data comprises a plurality of (selectively) distributed test points and predicted threshold brightness values for each point. The points are presented in test field coordinates or coordinates chosen relative to the direction of gaze. As the direction of gaze moves, corrections can be made to the test screen coordinates as will be described. As many test points as desired may be used, however, it has been found that about 200 test points can provide as detailed a visual field map with isopter lines as is normally desired. For other purposes, such as a quick driver's license screening test, as few as 10 or 15 test points will suffice. In any case, input of test point data is the first step in conducting the visual field test.

The test point data may be in the format shown in FIG. 4, if desired. In FIG. 4, the data for each test point is compressed into segments of 24-bit lengths. In the example of FIG. 4 the first six bits on the left end of the computer words of the test point array comprise the $x$ coordinate on the face of the cathode ray tube of the test point. The second six bits of the word provide the $y$ coordinate. This implies that the face of the test screen or cathode ray tube is divided into a 64 x 64 grid upon which test points may be presented. It will be appreciated by those skilled in the art, of course, that, if desired, a computer having a word length of 24 bits could be utilized, of if the word length of the computer is less than 24 bits, such as 16, the data can be spread over two or more words. Also, the number of binary digits or bits for each datum input could be changed. For example, a 256 x 256 grid could be provided for by using 8 bits for the $x$–$y$ coordinate data. This would provide greater registry precision for the test point data then the 6-bit data allows. It has, however, been found through experience that a 64 x 64 array is suitable for performing methods of the present invention.

Returning to the example of FIG. 4, the remaining 8 bits of each 24 bit computer word are occupied by two 4-bit numbers, the $b$ number and the $d$ number whose use will be described subsequently. It will suffice to say at this time the $b$ number represents the highest stimulus value which can be tested or which has been tested, and the $d$ number represents the lowest stimulus value which can be tested or which has been tested. The intensity data, which is also 4 bits in length, is initially set to a predicted threshold stimulus value and is supplied via intensity control register 46 and its associated digital-to-analog converter 47 to the intensity control circuits 45. It is thus possible to obtain any of 16 predetermined intensity settings from the 4-bit number.

When the test point array appears in memary, as indicated at block 201, the initialization program shown in flow chart form in FIG. 5 selects a test point in relative coordinates which is predicted to be in the normal blind spot area of the right eye as indicated at block 22. By applying a test point of a predetermined maximum brightness level in the area where the right eye blind spot should be, the subject's response or lack of response allows a machine decision to be made, determining which eye is being tested. At block 203 a test is performed to determine if the operator has elected to use the program's fixation point monitor or if external analog devices to be subsequently described are automatically performing this function. If the program is selected to perform this program then, as indicated at block 204, the subprogram for so doing is called and the right eye blind spot coordinate translated to account for the patient's change of fixation if any.

Assuming the fixation is satisfactory then at block 205 an initialization subprogram, which will be described subsequently, is called to perform the function of interfacing the computer 41 with the external equipment for the presentation of a test point. The initialization program passes an indicator which indicates whether the patient responded to the stimulus presented. If the subject did respond to the stimulus, as indicated by blocks 206 and 207, it is necessary to modify the input data slightly, as indicated at block 208 of FIG. 5. If the subject did not respond to the stimulus the program presumes that the right eye is being tested as the test spot is generated in the position where the right eye blind spot should be. Operator error, malorientation of the patient or presence of a visual field defect which overlaps the blind spot of the other eye can be determined by providing an additional test point in the area where the blind spot of the left eye should be.

The input data modification is required since the format of the original input data is usually chosen to be for coordinates relative to the fixation point for the right eye and a typical test pattern is usually chosen to omit testing in area of the blind spot. In accordance with the preferred embodiment of the invention, a separate subprogram is called for testing the normal blind spot. Thus a coordinate transformation amounting to a reflection about the vertical axis through the fixation point is necessary to change the input data to a form suitable for mapping the visual field of the left eye. When this is done at block 208, the subprogram exits. The main program's next action is, as indicated at bloc 64 of FIG. 3, to select a test point for presentation to the subject.

Referring now to FIG. 19 the flow chart of the subprogram for monitoring the direction of gaze of the subject, if this option is chosen, and for either changing the screen coordinates of a selected test point if the direction of gaze varies within acceptable limits or for terminating the test, if desired, is shown. It should be noted that it is possible for the subject's direction of gaze to vary on the screen in such a manner that some points in the test field would fall off the screen, points in areas (1, 1), (1, 2), (2, 1) or (2, 2) of FIG. 13b. Obviously, such points cannot be presented in their otherwise pseudo randomly occurring manner. As it is possible for such non-randomness to impair the results of the visual field test in the opinion of some authorities, the present invention provides the option by switch selection on the panel 30 of FIG. 2 and system data input circuits 53 of FIG. 1 to terminate the test or to write an error message and delay further testing until the subject's direction of gaze has been restored to within acceptable limits.

The test at block 209 of FIG. 19 determines whether any fixation point correction is required. The angle $\theta$ is chosen to be a suitable size to, for example, allow for measurement error. If no fixation correction is needed the program exits to continue the visual field test without fixation compensation.

If, on the other hand, the direction of gaze has moved significantly the test at block 291 inquires as to the procedure to be followed. If the termination option is chosen, then at block 292 an error message is written on the output medium and the program halts until fixation is restored. If fixation correction is desired, the test field coordinates are translated by the required amount at block 293. If, as determined at block 294, the corrected coordinate is on the screen, the compensation is accomplished and the program exits. If the compensated point falls off the screen then block 295 inquires as to whether any further test points remain. If not, the program exits noting the error condition by writing a suitable message at block 296. If further points remain then, as indicated at block 297, a new test point is chosen from the pseudo random sequence and the coordinate translation again applied. In this manner the relative coordinates kept in the computer memory store may be adjusted under program control for shifting of direction of gaze within reasonable limits.

Additionally, in the apparatus of FIG. 20, the brightness of the computer commanded brightness signal can be varied to compensate for the relative size change of the test caused by the recentering of the fixation point. This simply involves changing the brightness of the test point upon recentering the fixation point so that the test point appears to the subject to be the same size as it was before the subject changed the direction of his gaze. Before describing that part of the circuitry of the FIG. 20 apparatus which provides the brightness compensation, the theory underlying the technique employed will be discussed.

On a perimeter, the stimulus value of a spot of a designated size and brightness is essentially independent of the screen position of the spot. This is due to the fact that the eye-to-spot distance remains essentially constant on such a device. A campimeter, however, does not have a constant eye-to-screen distance D and the stimulus value W varies as the solid angle subtended by the spot varies.

Assuming the area A of the spot remains independent of position, this means that the stimulus on a campimeter will be a function of $1/D^2$. The stimulus value of a spot therefore varies in accordance with the equation $$W = \left(\frac{A}{D}\right)^2$$

Because of varying direction of gaze, a given position on the retina does not fall at the same screen position each time it is tested, and it is thus desirable to compensate for the inherent nonlinearities of the campimeter to render the threshold more meaningful and if eye movements are to be tolerated.

Let $A_0$ be the area of a stimulus at distance $D_0$ and let $A_1$ and $D_1$ be similarly defined. Then, since we desire that $W_1 = W_0$ and since $W = A/D^2$, it is easily shown that $A_1 = (D1/DO)^2 A_0$. Now, with respect to the display screen, let $d$ be the distance from the eye to the center of the screen along an axis perpendicular to the surface of the sceen and E be the eccentricity of a particular test point from the center, i.e., the distance of the location of the test point on the screen from the center of the screen, so that $$D^2 = d^2 + E^2$$

Now, let $A_0$ be the area of a designated stimulus value of the test point at the distance $d$ and $A_1$ be similarly defined at D. Then, from the above equations, $$A_1 = (D/d)^2 A_0$$

or $$A_1 = [1 + (E/d)^2] A_0$$

Next, let $$\Delta X = X - X_c$$
$$\Delta Y = Y - Y_c$$

where $X_c$ and $Y_c$ are the coordinates of the screen center and X and Y are the coordinates of test point. Then, $$E^2 = (\Delta X)^2 + (\Delta Y)^2$$

and $$\left[ A_1 = \frac{d^2 + (\Delta X)^2 + (\Delta Y)^2}{d^2 A_0} \right]$$

where the quantity in brackets is the desired compensation coefficient. The circuitry of the FIG. 20 apparatus for calculating the compensation coefficient will now be described.

Signals representing "the corrected test point" coordinates, X' and Y', are supplied by the adders 302 and 303 respectively to the subtractors 305 and 306. Simultaneously therewith, a reference voltage supply 308 supplies signals representing the screen center coordinates $X_c$ and $Y_c$ (which, of course, are constant for a particular test regime) to the subtractors 305 and 306, respectively. The screen center coordinates would be determined at the beginning of a test and the reference voltage supply 308 adjusted to apply the appropriate signals representing the coordinates. The screen center coordinates are subtracted from the "corrected test point" coordinates to obtain signals representing $\Delta X$ and $\Delta Y$ which are applied to multipliers 310 and 312, respectively. The multipliers multiply each applied signal by itself to obtain signals representing $(\Delta X)^2$ and $(\Delta Y)^2$. These signals are applied by the multipliers 310 and 312 to an adder 314 together with a signal from the reference voltage supply 308 representing the constant $d^2$. The adder 314 adds these signals and applies the resultant to a divider 316. The signal representing $d^2$ is also applied to the divider 316 which generates a signal representing the compensation coefficient $$\frac{d^2 + (\Delta X)^2 + (\Delta Y)^2}{d^2}$$

This signal is applied to a multiplier 318 along with the application thereto of the reference area signal $A_0$ from the computer. These two signals are multiplied together by the multiplier 318 to obtain a compensated area signal $A_1$ which is applied to the CRT device 304.

It should be noted that the above-described operation for generating a compensated brightness signal and especially the use of $\theta_x$ and $\theta_y$ is sufficiently accurate only if the angle which the direction of gaze makes with a line normal to the center of the screen is about 10 degrees or less so that the small-angle approximation of $\theta =$ tangent $\theta$ is valid. If compensation for a wider angle of gaze were desired, it would be necessary to include additional circuitry in the FIG. 20 apparatus to generate the necessary tangent functions. This circuitry would be inserted between the fixation monitoring device 301 and the adders 302 and 303 and could be of a type currently known in the art.

It is recognized that brightness of a spot (B) can be used interchanging with area of a spot (A), and that the relationship between these is $$B \cdot A^{0.8305} = \text{constant}$$

It will be appreciated by those skilled in the art that one may utilize other changes in brightness area (as in the above example) or a combination of both by the addition of suitable analog converting.

Even if the fixation point is not recentered, the FIG. 20 apparatus provides brightness compensation to enable the campimetry equipment of FIG. 1 to appear to the subject as a perimeter, i.e. equipment with constant eye-to-screen distance. That is, signals representing the coordinates of the test point, X and Y are supplied by the computer, via the adders 302 and 303 (which would add nothing to the signals since $\theta_x$ and $\theta_y$ would be of zero value) to the subtractors 305 and 306. Processing of the signal would then continue as discussed above to obtain the compensated brightness signal $B_1$.

Referring now to FIG. 6, the flow chart of the interface subprogram for presenting a test point to the subject is shown. It will be understood that the external equipment-computer interface can vary as the computer model or external equipment is changed. The particular sequence described here is presented as being illustrative of a particular interface between an IBM 1131B computer and external equipment constructed for use therewith. The invention, however, is not limited to this configuration. In this flow chart some steps are executed by the programmed computer 41 of FIG. 1 and some steps are executed by the external circuitry such as the system control circuits 54 of FIG. 1. The steps indicated in solid boxes are performed by the external equipment. When the program is entered, it should be noted, as indicated at block 77, that the external equipment requires that any remaining time in the delay between stimuli presented be completed before the next stimulus can be presented to the subject at a new test point.

The coordinate data for the 6 bit x–y coordinates and the 4-bit intensity data (i.e., stimulus strength) are presented to the external equipment as indicated at block 78 by presenting this data to 16 output lines and 4 control lines which are connected to the external equipment. Buffer registers on the external equipment are prepared to accept data when the computer 41 pulses control line 2 which clears the input buffers to the external equipment as indicated at block 79. The computer 41 then pulses control line 3 which loads the new data from the output fines into the buffers contained on the external equipment. These steps are performed as indicated at blocks 80 and 81 of FIG. 6.

Upon receipt of this data the external equipment initiates a 15 microsecond delay and then signals its receipt by an interrupt to the computer as indicated at blocks 82 and 83. When the program receives the interrupt signal, the computer applies a pulse to control line 4. This clears the joystick or external response media input buffer in the external hardware as indicated at blocks 84 and 85. This conditions the external equipment to provide a digitized response to the movement of the joystick when the subject signals that he has observed a spot or test stimulus. The pulse on control line 4 as indicated in block 84 also causes the external hardware to start a "duration of spot" time delay and to cause the spot to appear at the desired x-y coordinate and with the desired intensity on the CRT screen as indicated at block 86.

The control line 4 pulse also arms the audible horn so that upon the subject's response by joystick deflection, a relatively high-pitched sound indicates that the subject has responded correctly to the stimulus presented him. It will, of course, be understood that at the speeds at which the digital computer and external circuitry makes a decision as to the acceptability of the response, the subject is not likely to hear this high-pitched horn sound indicating a successful observation if, a few milliseconds later, the program determines that his response has been inadequate or incorrect, and modifies the sound of the horn accordingly.

In any event the subject will either respond to the test stimulus if he sees it in some manner which may or may not be correct or acceptable or he will not respond if he does not observe the test stimulus. As indicated by the test block 87 of FIG. 6, if the subject does not respond before the "duration of spot" time delay runs its course then the external equipment automatically times out the spot and ceases to present this stimulus to the subject. This is indicated at block 88. A signal to the computer noting no response is provided at block 89 and the "time delay between spots" is started at block 90. It should be noted that the "time delay between spots" is variable and may be controlled by the operator through the use of the switches 30 of the input device 29 of FIG. 2.

The subject responds to a stimulus by moving the joystick in the general direction of the portion of the switch circuit corresponding to the sector of the screen in which he observes the spot. The response may or may not be correct depending upon the allowable error margin chosen for the test. This error margin is determined by the switch setting of switches 30 of the input device 29 of FIG. 2. A subject response is usually not precise, and may miss the correct direction by 45° or more. The switch circuit includes a plurality of switches, such as 28, to provide a like plurality of sectors of desired angle such as 12.86° which determines the number adjacent sectors about the angular sector in which the stimulus is presented that will be accepted as being a correct response. The diode encoding matrix 50 of FIG. 1 is utilized to encode the switch sector information provided by the subject. A Gray code is used for this purpose. No two adjoining switch positions differ by more than one binary digit or bit from each other. This eliminates the possibility of a spurious response due to the simultaneous engagement of 2 switch contacts by the joystick. This assures a response accuracy of ±½ angular sector. A digital number representative of the sector in which the response was observed by the subject is thus entered into the response register 51.

Upon receipt of an interrupt as a result of closure of a joystick switch response register 51 is interrogated by the computer as indicated in block 91 of FIG. 6. Simultaneously the external hardware turns off the stimulus spot as indicated at block 92. Based on the known spot coordinates presented to the subject the program then computes at block 93, the angular sector where the subject's response should have been. If the response is not within the allowable number of error sectors of where it should have been (as indicated as block 94), control line 1 is pulsed (block 95) causing the pitch of the horn to change to a relatively lower sound indicating an incorrect response to the subject (block 96). This corresponds to the interpretive program of FIG. 3 (block 69).

The false response is noted and the program starts the "time between spot delay" cycle to prevent premature display of the next test point to the subject as indicated at block 97.

If the response was within the allowable number of error sectors of where it should have been, then the "time between spots" delay is started immediately as indicated at block 98, and the program exits to call the modification programs, as indicated at blocks 70 and 71 of the overall flow chart of FIG. 3 to interpret the patient's response to the test stimulus.

Referring now to FIG. 7, the subprogram to modify the data points based upon the subject's response to the stimulus (blocks 72, 73, 74 and 75 of FIG. 3) is illustrated in flow chart form. This program determines the next intensity of the test spot to be presented to the subject at the coordinates in question. Alternatively, the program determines if the threshold level has been reached at this coordinate. If the threshold level has been reached, testing at the point in question is complete. An option which may be used if the threshold is too far removed from the predicted threshold is to retest the threshold at the particular point.

It has been found if when a given stimulus is not seen the intensity of the stimulus next presented at that point is increased by 4 units, but if the given stimulus was seen the intensity of the next stimulus is reduced by 2 units, greatest efficiency is obtained. The steps just described are performed by the program as indicated at blocks 101, 102 and 103 of FIG. 7. The brightness limit $b$ and the dimness limit $d$ of a data point represent, at any given time, the supremum and the infinum of the set of stimulus values which have been tested at that point. The $b$ numbers are initially set to the highest stimulus level to be used in the test and are then reduced during the testing process in accordance with the subject's responses. The $d$ numbers are initially set to the lowest stimulus level to be used in the test and then increased during the testing process in accordance with the subject's responses. The numbers IBB referred to in blocks 102 and 103 of FIG. 7 is a predicted test value which will be used at the next text presentation at the coordinates if certain conditions as determined by the remainder of the program are satisfied.

In any event, the next step (as indicated at block 104) is to determine if the $b$ limit of the test coordinate has yet been tested. If it has been tested, then the program determines (block 105) if the dimness limit has been previously tested. If both have been previously tested, the predicted value of IBB is set to the half-way point of the previously tested values (as indicated at block 106). This type of search may be termed a binary cut technique which may be shown mathematically to be very efficient. If the $b$ limit had not been tested (block 104) a flag $k$ is set equal to 1 to indicate this fact. If the dimness limit had not been previously tested the flag $k$ is set to a different value (3) to indicate this fact and if both extrema have been previously tested the flag $k$ is set to 2 indicating this fact. These steps are performed at blocks 107, 108 and 109, respectively.

Equipped with the information concerning the limit testing for brightness and dimness, the program logic can determine if the threshold has been reached. The absolute numerical difference between the brightness and dimness indicators $b$ and $d$ is either greater, equal to, or less than 1. This difference is an indication of whether the threshold has been reached. Such a test is performed at block 109 in FIG. 7 and corresponds to the entry to block 32 of FIG. 3. If the difference is greater than 1, it is apparent that the threshold has not yet been reached since the threshold is, as previously noted, defined as that value of brightness of the stimuli which when reduced by one step cannot be seen. On the other hand, if the $b$ and $d$ difference is exactly equal to 1 the threshold may or may not have been reached. It remains to be determined if the limits previously discussed have been tested in order to determine this fact. Such a test is performed at block 110 and if the brightness limit has not been previously tested or if both limits have not been tested as indicated by the value of the flag $k$ then the threshold value has not yet been reached. Therefore, further testing for this point must be made to obtain the threshold. Using the newly computed brightness criteria (Intensity Data=IBB) (at block 111) the program exits to continue testing.

In the situation where the b–d difference is less than 1, a test is performed at block 112 of FIG. 7 to determine the value of the flag $k$. If the flag $k$ is equal to either 2 or 3 then the threshold value has been reached. If the flag $k=1$ it indicates that the brightness limit has not yet been tested and the brightness limit B is set to maximum +1 at block 118 to indicate that the maximum available brightness could not be seen. Thus the output scale of brightness values contains one extra number when compared to the scale of the test provided. In all three cases the threshold has been reached and a test is performed at block 113 to determine if the recheck option is called for. If no recheck is indicated then an immediate exit is made via block 114 in which the data for the test point is removed from the test array and stored in the output data array. If a recheck option is open a test is performed (at block 115) to determine if the recheck is necessary. This test compares the measured threshold with a predetermined threshold based on the normal visual threshold. If this test fails, it is an indication that possibly some abnormality has taken place. Such a gross abnormality could indicate blinking in attention or momentary defocusing. The test point is set up for a recheck at block 116 by reinitializing the data concerning the brightness and dimness limits. If no recheck is indicated and the threshold has been determined, then the test point is removed from the test array (at block 114) and its threshold data stored in the output array. In any event the program has, at this point in time, modified the test point in response to the subject's response in a manner to arrive closer to the threshold determination.

Referring now to FIGS. 8 and 8a, the logic flow for the blind spot mapping subprogram is shown. A normal blind spot is illustrated schematically in FIG. 9. The blind spot map is a program option which may be controlled by the switches comprising the system data input circuit 53 of FIG. 1. Before discussing the details of the logic of FIG. 8, a general statement of the manner in which the blind spot map is performed will be of assistance in following the program logic. It is assumed initially by the program that the retinal or relative coordinates geometrical center of the blind spot is known. Test stimuli are then presented to the subject at approximately 1° arc increments along a ray (ray 1) directed from the supposed center until the right edge of the blind spot is encountered. It will be noted that the order of test shown in FIG. 9 is the order of test used for mapping the blind spot border. The test used for mapping the blind spot is preferably interposed with the pseudo-random test stimuli used elsewhere, with an array of one blind spot test for each two of the others, but in a random manner. The left edge of the blind spot is determined in a similar fashion by ray 2. The perpendicular bisector of the line joining the two horizontal edges of the blind spot is then computed. Test points are presented at approximately 1° arc increments vertically downward along a ray 3 directed along this bisector until the bottom edge of the blind spot is encountered. Test points are then presented at approximately 1° arc intervals upwardly in a vertical direction along the ray 4 until the upper edge of the blind spot is encountered. Thus the upper and lower limits of a vertical chord through the blind spot are established. The perpendicular bisector of this chord passes through the geometrical center of the blind spot and may be referred to as the computed horizontal meridian of the blind spot. Test points are presented at approximately 1° arc increments (rays 5 and 6) along the horizontal meridian to establish the true horizontal extent of the blind spot. With the horizontal extent and horizontal meridian established the center of the blind spot has then been determined with accuracy. A plurality of rays are then defined from the center of the blind spot to its edges at varying angles such as that shown by the dotted lines (rays 7, 8, 9 and 10) labeled "representative later test ray." Test points may then be taken along these rays to determine the actual shape of the blind spot. As many such rays may be used as desired to determine the blind spot shape. Generally 8 or 10 rays are sufficient to complete a map of the blind spot to the desired degree of precision.

Referring now to FIG. 8, the logic flow of the blind spot mapping subprogram is shown in detail. Upon entry, a test is made at block 121 to determine if a new ray is to be tested or if this is the first entry into the program. If a new ray is to be tested or if this is the first entry into the subroutine, a second test is performed at block 122 to determine if all desired rays have been tested. If both these conditions are met then the blind spot map is finished. Further blind spot extent testing is suppressed by setting a flag (block 123), and the program exits.

If the blind spot test is still underway (as indicated by the test results of blocks 121 and 122) a new ray is chosen by the logic discussed above (block 125). A test point coordinate is computed in retinal coordinates at approximately a 1° arc increment along the ray (block 126). Of course before each test point is presented it is corrected for fixation point shift in the manner expressly discussed. If the computed test point coordinate extends off the edge of the visual field or into the fixation point it is apparent that an error has resulted or a large visual field defect exists. Such an error could be caused by a failure of the patient's focus or attentiveness. A test to determine this is performed (block 127) and if such an error has occurred blocks 128 and 129 indicate the remedy to be taken. The program then proceeds to point B of FIG. 8a.

If the computed test point is valid, it is presented to the subject (block 120) by calling the previously described joystick response and external equipment interface subprogram. Upon return from this program a test is performed (block 131) to determine if the spot was seen. If the spot was not seen it was in the blind spot and its coordinates are placed in the output array at block 132. In this case the program exits to continue the blind spot testing until all test rays are finished. If the spot was seen, it occurred just outside the edge of the blind spot and its coordinates are placed in the main test point array for an accurate threshold determination at block 133. It is also desirable that coordinates of a point two more steps out along the ray be placed in the main test point array for an accurate threshold determination. A flag is then set to indicate no more tests be performed on this ray (block 134) since the edge of the blind spot has been found along this ray. The program proceeds to B (shown in FIG. 8a).

At B (block 135) it is determined if both the horizontal and vertical meridians of the blind spot have been tested. If both meridians have been tested it is determined (block 136) if the actual center of the blind spot lies within an acceptacle error margin from the predicted center. If the two centers do not correspond within acceptable limits a new horizontal meridian is computed based on the test data accumulated. The program logic previously discussed accomplishes this and the program exits to continue the blind spot test.

In the case where both horizontal and vertical meridians have been tested and where the actual center of the blind spot corresponds within acceptable limits to the predicted center, the program exits to continue the blind spot map. The blind spot map subprogram is complete when all rays have been tested.

It will be obvious to those skilled in the art that essentially the same process can be used for mapping disease scotomas which may be less dense than the normal blind spot. In such cases the brightness value of the test used for mapping the scotoma should be slightly dimmer than the threshold level in the scotoma. When mapping disease scotomas it is usually desirable to test along additional rays extending from rays of substantial length.

Referring now to FIGS. 10, 11 and 12 when the entire input array of test points have been examined and the threshold value of each determined, an output program whose logic flow is illustrated in FIG. 10 is called to record the data in usable form. A form which has been found to be particularly useful is a graphical plotter display. Such a graphical plotter may produce a complete visual field plot with isopters as shown in FIG. 12. The isopter lines connect visual field points having the same calculated threshold. On the other hand, a very short visual field display having only a few data points is sometimes desirable as shown in FIG. 11. This type of short visual field display is useful for such purposes as driver's license test or for a quick scan search for a visual defect or scotoma in a particular area of the visual field.

The program of FIG. 10 first determines (block 140) if there is a short visual field test to display. If such a plot is to be performed (block 141), the data is plotted in the format shown in FIG. 11. Here the numbers indicate the threshold at each individual test point of the examination. A title is provided at the top of the display and the subject's name, date of the test, and other pertinent data are presented in a legend at the lower portion. For example, in the plot of FIG. 11, a typical legend might read that the angular arc covered by the circle is 5 degrees. Of course, it will be apparent that if a large number of test points are used that this type display would be impractical because of cluttering.

If a short visual field test is not to be displayed, a test is made at block 144 to determine if a complete visual field with isopter display is to be done. If there is a complete visual field with isopters to be displayed a visual field map such as illustrated in FIG. 12 is drawn (block 145). A display of this type may be of substantial interest to the examiner to locate visual field abnormalities. This type display also may be utilized for interpreting or following the progress or treatment of a disease involving the visual system.

Although the invention has been described with reference to particular preferred embodiments thereof, many changes and modifications will become apparent to those skilled in the art in view of the foregoing description which is intended to be illustrative and not limiting of the invention defined in the appended claims.

What is claimed is:

1. An automatic machine implemented process for testing the visual field of a subject comprising the steps of:
   determining, under machine control, the instantaneous location of the direction of gaze of the subject;
   presenting, under machine control, momentary, stationary spots of light of selected stimulus value on a test screen at selected test locations in a two dimensional test field, said test field being centered relative to said instantaneous location of the direction of gaze of the subject;
   determining whether the subject perceived particular spots of light at each of said selected locations; and
   presenting, under machine control, additional momentary, stationary spots of light of computed stimulus value at said selected test locations by computing the stimulus value to be presented at a particular test location in response to the subject's history of perception response at the test location in question such that the threshold value of stimulus perceived at each selected test location in the test field is detected.

2. The method of claim 1 and further including the step of displaying, under machine control, the threshold value of stimulus perceived at each selected test location.

3. The method of claim 1 wherein the step of determining, under machine control, the instantaneous location of the fixation point of a subject is performed by monitoring the relative location, on an image of the eye pupil, of the image of a point source of radiation located effectively at infinity.

4. The method of claim 1 wherein the step of determining, under machine control, the instantaneous location of the fixation point of a subject is performed by monitoring the changes in the horizontal and vertical components of the electric field surrounding the eyeball caused by the shifting corneo-retinal standing potential.

5. The method of claim 1 wherein said momentary, stationary light spots are presented under machine control in a sequence not predictable by the subject.

6. The method of claim 5 wherein said unpredictable sequence dynamically varies during the course of presentation of spots of computed stimulus level under machine control in response to the subject's perception history of stimuli at the same test location in the test field.

7. The method of claim 1 and further including the initial step, prior to commencing the initial determination of the subject's instantaneous fixation point, of subjectively obtaining a refractive correction of the eye of the subject.

8. The method of claim 1 wherein the presentation of said computed stimulus values at each test location is sufficiently spaced apart in time to substantially overcome the effects of retinal bleaching.

9. The method of claim 1 and further including the initial steps of determining, under machine control, which eye of the subject is being tested and selecting, in response to such determination, the coordinates of test locations in the two dimensional test field centered on the instantaneous direction of gaze of the subject.

10. The method of claim 1 wherein the step of presenting test spots on a test screen of constant brightness at test locations in a test field centered relative to said instantaneous location of the direction of gaze of the subject is performed by applying a pure translation to preselected test point coordinates having a fixed coordinate location relative to the direction of gaze of the subject.

11. The method of claim 1 including the steps of supplying an indication of correct perception to the subject if the subject correctly perceives a stimulus and supplying an indication of incorrect perception if the subject incorrectly indicates perception of the stimulus.

12. The method of claim 1 wherein the subject indicates perception of a stimulus by operating a manual device.

13. The method of claim 1 wherein a determination that the subject perceived a stimulus is made by monitoring a change in the evoked cortical potentials in the occipital center.

14. The method of claim 1 wherein a determination that the subject perceived a stimulus is made by detecting movement of the subject's eye in the direction of the test location at which the stimulus was presented.

15. The method of claim 1 further including the step of modifying the stimulus value of the spots of light presented at the test locations in accordance with the amount and direction of translation of the test point coordinates.

16. The method of claim 15 wherein said modifying step comprises computing the stimulus value $B_1$ of a spot of light at a translated test point in accordance with the expression $$B_1 = \left[ \frac{d^2 + (\Delta X)^2 + (\Delta Y)^2}{d^2} \right]$$

where $d$ is the distance from the subject's eye to the center of the test screen along an axis perpendicular to the surface of the screen, $B_0$ is a predetermined reference stimulus value, and $(\Delta X)^2 + (\Delta Y)^2$ is the square of the distance from the center of the test screen to the location of the translated test point.

17. The method of claim 1 further including the step of communicating an alarm signal and ceasing presentation of said light spots if the location of the subject's direction of gaze deviates by a preselected limiting amount from a reference point in said test field.

18. The method of claim 17 and further including the step of resuming the presentation of said light spots when the direction of gaze of the subject returns to within said preselected limiting amount from the reference point in said test field.

19. The method of claim 17 wherein the step of monitoring the relative location in said two dimensional test field of the direction of gaze of the subject is performed by monitoring, under machine control, the relative location, on an image of the eye pupil, of the image of a point source of radiation located effectively at infinity.

20. The method of claim 17 wherein the step of monitoring the relative location in said two dimensional test field of the fixation point of the subject is performed by monitoring, under machine control, the changes in the horizontal and vertical components of the electric field surrounding the eyeball caused by the corneo-retinal standing potential.

21. An automatic, machine implemented, process for testing the visual field of a subject comprising the steps of:
  subjectively obtaining a refractive correction for the eye of the subject to be tested;
  monitoring, under machine control, the coordinates on a planar test screen of the instantaneous location of the direction of gaze of the subject;
  presenting, under machine control, momentary, stationary spots of light of selected stimulus value at locations on said planar test field determined in response to the instantaneous location of the direction of gaze of the subject, the stimulus value being adjusted also in response to the instantaneous location of the direction of gaze of the subject;
  determining whether the subject perceived each such light spot; and
  presenting, under machine control, additional momentary, stationary spots of light of computed stimulus value at the same location relative to the instantaneous direction of gaze of the subject by computing the stimulus value to be presented at a given location relative to the instantaneous direction of gaze of the subject in response to the subject's history of perception response at said point such that the threshold value of stimulus perceived at each such location is detected.

22. The method of claim 21 and further including the step of displaying the threshold value at each such selected location relative to the instantaneous fixation point of the subject.

23. The method of claim 21 and further including the step of terminating the test if the instaneous location of the subject's direction of gaze varies beyond preselected limits.

24. The method of claim 21 and further including the step of performing a detailed map of the normal blind spot of the subject by appropriate selection of test points relative to the instantaneous location of the subject's fixation point.

25. The method of claim 21 wherein the relative location of said light spots is chosen in a sequence unpredictable by the subject.

26. The method of claim 21 and further including the step of momentarily interrupting the test if the subject blinks.

27. The method of claim 21 wherein the step of adjusting the stimulus value of the spots of light comprises the step of computing, for any particular spot of light at a certain location relative to the instantaneous gaze of the subject, a stimulus value $$B_1 = \left[ \frac{d^2 + (\Delta X)^2 + (\Delta Y)^2}{d^2} \right] B_0$$

where $d$ is the distance from the subject's eye to the center of the test screen along an axis perpendicular to the surface of the screen, $B_0$ is a predetermined reference stimulus value, and $(\Delta X)^2 + (\Delta Y)^2$ is the square of the distance from the center of the screen to said certain location.

References Cited

UNITED STATES PATENTS 3,664,732    5/1972    Lynn _____ 351—39

DAVID SCHONBERG, Primary Examiner

P. A. SACHER, Assistant Examiner

U.S. Cl. X.R.
351—23, 36, 37